US012218425B2

(12) United States Patent
Varnoosfaderani et al.

(10) Patent No.: US 12,218,425 B2
(45) Date of Patent: Feb. 4, 2025

(54) BASE STATION ANTENNAS HAVING REFLECTOR ASSEMBLIES INCLUDING A NONMETALLIC SUBSTRATE HAVING A METALLIC LAYER THEREON

(71) Applicant: Outdoor Wireless Networks LLC, Claremont, NC (US)

(72) Inventors: Mohammad Vatankhah Varnoosfaderani, Plano, TX (US); Amit Kaistha, Coppell, TX (US); Fan He, Jiangsu (CN); Nengbin Liu, Jiangsu (CN); PuLiang Tang, Jiangsu (CN); Ruixin Su, Jiangsu (CN)

(73) Assignee: Outdoor Wireless Networks LLC, Claremont, NC (US)

(*) Notice: Subject to any disclaimer, the term of this patent is extended or adjusted under 35 U.S.C. 154(b) by 139 days.

(21) Appl. No.: 17/907,106

(22) PCT Filed: Apr. 27, 2021

(86) PCT No.: PCT/US2021/029356
§ 371 (c)(1),
(2) Date: Sep. 23, 2022

(87) PCT Pub. No.: WO2021/222217
PCT Pub. Date: Nov. 4, 2021

(65) Prior Publication Data
US 2023/0104131 A1 Apr. 6, 2023

Related U.S. Application Data

(60) Provisional application No. 63/016,699, filed on Apr. 28, 2020.

(51) Int. Cl.
*H01Q 15/00* (2006.01)
*H01Q 1/24* (2006.01)
*H01Q 21/06* (2006.01)

(52) U.S. Cl.
CPC ........... *H01Q 15/0013* (2013.01); *H01Q 1/24* (2013.01); *H01Q 1/246* (2013.01); *H01Q 15/00* (2013.01);
(Continued)

(58) Field of Classification Search
CPC ............... H01Q 15/0013; H01Q 1/246; H01Q 15/0086; H01Q 21/062; H01Q 15/00; H01Q 1/24; H01Q 21/06
See application file for complete search history.

(56) References Cited

U.S. PATENT DOCUMENTS 5,184,145 A 2/1993 Devillers et al.
5,451,969 A * 9/1995 Toth ...................... H01Q 19/19 343/781 CA (Continued)

FOREIGN PATENT DOCUMENTS

CN 1886864 A 12/2006
CN 100492763 C 5/2009

(Continued)

OTHER PUBLICATIONS

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

(Continued)

*Primary Examiner* — Hai V Tran
(74) *Attorney, Agent, or Firm* — Myers Bigel, P.A.

(57) ABSTRACT

Base station antennas are provided that include a reflector assembly and a radiating element. The reflector assembly includes a reflector. The radiating element extends forwardly from the reflector. The reflector includes a nonmetallic substrate, and a metal layer mounted on the substrate.

23 Claims, 20 Drawing Sheets

(52) U.S. Cl.
CPC ......... *H01Q 15/0086* (2013.01); *H01Q 21/06* (2013.01); *H01Q 21/062* (2013.01)

(56) References Cited

U.S. PATENT DOCUMENTS

| | | | | |
|---|---|---|---|---|
| 5,982,339 | A | 11/1999 | Lalezari et al. | |
| 6,025,812 | A | 2/2000 | Gabriel et al. | |
| 6,339,047 | B1 * | 1/2002 | Christopherson | H10N 60/0801 505/820 |
| 6,388,637 | B1 | 5/2002 | Davis | |
| 6,831,615 | B2 * | 12/2004 | Gottl | H01Q 1/246 343/810 |
| 7,679,576 | B2 * | 3/2010 | Riedel | H01Q 19/108 343/810 |
| 7,907,096 | B2 | 3/2011 | Timofeev et al. | |
| 7,999,752 | B2 * | 8/2011 | Riedel | H01Q 1/246 343/797 |
| 10,396,460 | B2 | 8/2019 | Kosaka et al. | |
| 11,070,269 | B2 | 7/2021 | Lee et al. | |
| 11,482,774 | B2 | 10/2022 | Hou et al. | |
| 11,658,372 | B2 * | 5/2023 | Kosaka | H01Q 21/28 343/834 |
| 11,749,881 | B2 | 9/2023 | Hou et al. | |
| 2004/0169612 | A1 | 9/2004 | Song et al. | |
| 2004/0201542 | A1 | 10/2004 | Gottl et al. | |
| 2004/0259597 | A1 | 12/2004 | Gothard et al. | |
| 2005/0134522 | A1 * | 6/2005 | Waltho | H01Q 1/28 343/909 |
| 2005/0264463 | A1 | 12/2005 | Gottl et al. | |
| 2006/0273865 | A1 * | 12/2006 | Timofeev | H01Q 3/36 333/161 |
| 2007/0229385 | A1 | 10/2007 | Deng et al. | |
| 2007/0241979 | A1 | 10/2007 | Yang | |
| 2008/0036674 | A1 | 2/2008 | Riedel et al. | |
| 2009/0135076 | A1 | 5/2009 | Foo | |
| 2009/0224994 | A1 | 9/2009 | Le et al. | |
| 2012/0075155 | A1 * | 3/2012 | Lindmark | H01Q 19/106 343/834 |
| 2012/0087284 | A1 | 4/2012 | Linehan et al. | |
| 2012/0280874 | A1 | 11/2012 | Kim et al. | |
| 2013/0234883 | A1 | 9/2013 | Ma et al. | |
| 2014/0313095 | A1 | 10/2014 | Pu et al. | |
| 2015/0084823 | A1 | 3/2015 | Wang et al. | |
| 2015/0097739 | A1 | 4/2015 | Samuel | |
| 2015/0263424 | A1 | 9/2015 | Sanford et al. | |
| 2016/0365618 | A1 | 12/2016 | Kim et al. | |
| 2016/0372839 | A1 | 12/2016 | Watson et al. | |
| 2017/0040665 | A1 | 2/2017 | Takashima et al. | |
| 2017/0040679 | A1 | 2/2017 | Fröhler et al. | |
| 2017/0099041 | A1 | 4/2017 | Wall | |
| 2017/0170549 | A1 | 6/2017 | Buondelmonte | |
| 2018/0040948 | A1 | 2/2018 | Göttl et al. | |
| 2018/0269577 | A1 | 9/2018 | Kosaka et al. | |
| 2018/0290356 | A1 | 10/2018 | Isohätälä et al. | |
| 2018/0323513 | A1 | 11/2018 | Varnoosfaderani et al. | |
| 2019/0123426 | A1 | 4/2019 | Bryce | |
| 2019/0173162 | A1 | 6/2019 | Farzaneh et al. | |
| 2019/0181557 | A1 | 6/2019 | Isik et al. | |
| 2019/0190146 | A1 | 6/2019 | Hand et al. | |
| 2019/0267700 | A1 | 8/2019 | Hendrix et al. | |
| 2019/0267701 | A1 | 8/2019 | Kim et al. | |
| 2019/0268046 | A1 | 8/2019 | Kim et al. | |
| 2019/0312338 | A1 | 10/2019 | Guntupalli et al. | |
| 2019/0312394 | A1 | 10/2019 | Paynter et al. | |
| 2019/0393597 | A1 | 12/2019 | Kosaka et al. | |
| 2020/0076079 | A1 | 3/2020 | Shan et al. | |
| 2020/0099139 | A1 | 3/2020 | Rebegea et al. | |
| 2020/0288495 | A1 | 9/2020 | Gao et al. | |
| 2020/0321700 | A1 | 10/2020 | Wu et al. | |
| 2021/0218156 | A1 | 7/2021 | Patel et al. | |
| 2021/0226344 | A1 | 7/2021 | Wu et al. | |
| 2021/0305717 | A1 | 9/2021 | Hou et al. | |
| 2022/0021123 | A1 | 1/2022 | Koul et al. | |
| 2022/0102842 | A1 | 3/2022 | Li et al. | |
| 2022/0285858 | A1 | 9/2022 | Xiao et al. | |
| 2023/0056237 | A1 | 2/2023 | Hou et al. | |
| 2023/0361452 | A1 | 11/2023 | Hou et al. | |

FOREIGN PATENT DOCUMENTS

| | | | |
|---|---|---|---|
| CN | 201528038 | U | 7/2010 |
| CN | 101950846 | A | 1/2011 |
| CN | 201893434 | U | 7/2011 |
| CN | 102800956 | A | 11/2012 |
| CN | 103490175 | A | 1/2014 |
| CN | 103715521 | A | 4/2014 |
| CN | 104319486 | A | 1/2015 |
| CN | 206225553 | U | 6/2017 |
| CN | 107453044 | A | 12/2017 |
| CN | 107834198 | A | 3/2018 |
| CN | 108242596 | A | 7/2018 |
| CN | 109219905 | A | 1/2019 |
| CN | 110323564 | A | 10/2019 |
| CN | 111129769 | A | 5/2020 |
| CN | 107459805 | B | 11/2020 |
| CN | 111989824 | A | 11/2020 |
| CN | 112201939 | A | 1/2021 |
| CN | 215418610 | U | 1/2022 |
| CN | 114094347 | A | 2/2022 |
| EP | 0982800 | A2 | 3/2000 |
| EP | 1204161 | A1 | 5/2002 |
| EP | 2784876 | A1 | 10/2014 |
| EP | 2827449 | A2 | 1/2015 |
| EP | 3544204 | A2 | 9/2019 |
| EP | 3751665 | A1 | 12/2020 |
| EP | 3966898 | A2 | 3/2022 |
| JP | S6081902 | A | 5/1985 |
| JP | 2006108841 | A | 4/2006 |
| KR | 102129787 | B1 | 7/2020 |
| WO | 9700586 | A1 | 1/1997 |
| WO | 2009061966 | A1 | 5/2009 |
| WO | 2011160649 | A2 | 12/2011 |
| WO | 2011160849 | A1 | 12/2011 |
| WO | 2013016939 | A1 | 2/2013 |
| WO | 2019100325 | A1 | 5/2019 |
| WO | 2019154362 | A1 | 8/2019 |
| WO | 2019236203 | A2 | 12/2019 |
| WO | 2020010039 | A1 | 1/2020 |
| WO | 2020072880 | A1 | 4/2020 |
| WO | 2020159902 | A1 | 8/2020 |
| WO | 2021150384 | A1 | 7/2021 |
| WO | 2021195040 | A2 | 9/2021 |
| WO | 2021222217 | A1 | 11/2021 |
| WO | 2022055764 | A1 | 3/2022 |
| WO | 2023029431 | A1 | 3/2023 |

OTHER PUBLICATIONS

International Search Report and the Written Opinion of the International Searching Authority corresponding to International Patent Application No. PCT/US2021/029356 (12 pages) (mailed Aug. 13, 2021).

Chang et al. "Equivalent Circuit Modeling of Active Frequency Selective Surfaces" Radio and Wireless Symposium, pp. 663-666 (2008).

He, Yejun , et al., "Novel Dual-Band, Dual-Polarized, Miniaturized and Low-Profile Base Station Antenna", IEEE Transactions on Antennas and Propagation, vol. 63, No. 12, Dec. 2015, 5399-5408.

Joozdani et al. "Equivalent Circuit Model of Frequency Selective Surfaces Embedded in Non-homogeneous Dielectric Slab" 24th Iranian Conference on Electrical Engineering (ICEE), pp. 380-383 (2016).

Shepard et al. "Argos: Practical Many-Antenna Base Stations" Proceedings of the 18th Annual International Conference on Mobile Computing and Networking (12 pages) (Aug. 26, 2012).

Vasquez-Peralvo et al. "Inductive Frequency Selective Surface: An Application for Dichroic Sub-Reflectors" IEEE Access, vol. 8, pp. 22721-22732 (2020).

Partial Supplementary European Search Report corresponding to EP Application No. 21797005.2 (13 pages) (dated Mar. 7, 2024).

(56) References Cited

OTHER PUBLICATIONS

Extended European Search Report corresponding to European Patent Application No. 21797005.2 (15 pages) (dated Jun. 4, 2024).

* cited by examiner

BASE STATION ANTENNAS HAVING REFLECTOR ASSEMBLIES INCLUDING A NONMETALLIC SUBSTRATE HAVING A METALLIC LAYER THEREON

CROSS-REFERENCE TO RELATED APPLICATION

The present application claims the benefit of and priority from U.S. Provisional Patent Application No. 63/016,699 filed Apr. 28, 2020, the entire content of which is incorporated herein by reference.

BACKGROUND

The present invention generally relates to radio communications and, more particularly, to base station antennas for cellular communications systems.

Cellular communications systems are well known in the art. In a cellular communications system, a geographic area is divided into a series of regions or "cells" that are served by respective macrocell base stations. Each macrocell base station may include one or more base station antennas that are configured to provide two-way radio frequency ("RF") communications with subscribers that are within the cell served by the base station. In many cases, each base station is divided into "sectors." In one common configuration, a hexagonally-shaped cell is divided into three 120° sectors in the azimuth plane, and each sector is served by one or more macrocell base station antennas that have an azimuth Half Power Beamwidth (HPBW) of approximately 65°. So-called small cell base stations may be used to provide service in high-traffic areas within portions of a cell. Typically, the base station antennas are mounted on a tower or other raised structure, with the radiation patterns that are generated by the base station antennas directed outwardly.

Most macrocell base station antennas comprise one or more linear or planar arrays of radiating elements that are mounted on a flat panel reflector assembly. The reflector assembly may serve as a ground plane for the radiating elements and may also reflect RF energy that is emitted rearwardly by the radiating elements back in the forward direction. FIGS. 1A and 1B are a perspective view and a cross-sectional view, respectively, of a conventional reflector assembly 10 for a base station antenna. The reflector assembly 10 has a front 12, a back 14 and first and second sides 16. As can be seen in FIGS. 1A-1B, the conventional reflector assembly 10 may comprise a sheet of metal, such as aluminum, and the front 12 thereof may serve as a main reflective surface 20 that reflects RF energy. Top, bottom and side edges of the sheet metal may each be bent backwardly at an angle, such as a 90° angle. Accordingly, each side 16 of the reflector assembly 10 may have an L-shaped cross-section, as shown best in FIG. 1B. A plurality of openings 22 may be provided in the main reflective surface 20. Various elements of the base station antenna that includes the reflector assembly 10 such as, for example, the radiating elements, feed boards, decoupling structures, isolation structures and/or structural supports may be mounted in the openings 22. Other of the openings 22 may include attachment structures (e.g., screws, rivets and the like) that may be used to attach various elements/structures to the reflective surface 20. Still other of the openings 22 may allow elements (e.g., coaxial cables or other RF transmission lines or structures) to pass between the back and front surfaces of the reflector 10.

More recently, base station antennas have been introduced that have reflector assemblies that include integrated RF chokes. FIGS. 2A and 2B are a perspective view and a cross-sectional view, respectively, of a conventional reflector assembly 30 that includes such integrated RF chokes. The reflector assembly 30 has a front 32, a back 34 and first and second sides 36. The reflector assembly 30 may comprise a sheet of metal, such as aluminum, so that the front 32 of the reflector assembly 30 acts as a main reflective surface 40 that reflects RF energy A plurality of openings 42 may be provided in the main reflective surface 40 that may serve the same functions as the openings 22 discussed above. As shown in FIGS. 2A-2B, the reflector assembly 30 differs from the reflector assembly 10 in that each side 36 of reflector assembly 30 has a U-shaped cross section (see FIG. 2B) as opposed to the L-shaped cross-section of the sides 16 of reflector assembly 10. The U-shaped sides 36 of the reflector assembly 30 form U-shaped channels that run the length of the antenna and act as RF chokes 44. An RF choke is a circuit element that allows some currents to pass, but which is designed to block or "choke" currents in certain frequency bands. The antenna that includes reflector assembly 30 will have one or more linear arrays of radiating elements. Each RF choke 44 (i.e., the U-shaped channels) may have an electrical path length (i.e., the sum of the lengths of each side and the bottom of the U-shape) that corresponds to a 180° phase shift at the center frequency of the frequency band at which one of the linear arrays of radiating elements of the antenna radiates RF energy. The RF chokes 44 may reduce the amount of RF energy that travels laterally along the reflector assembly 30 and hence may improve the front-to-back ratio performance of the base station antenna.

SUMMARY

Pursuant to embodiments of the invention, base station antennas are provided that include a reflector assembly and a radiating element. The reflector assembly includes a reflector. The radiating element extends forwardly from the reflector. The reflector includes a nonmetallic substrate, and a metal layer mounted on the substrate.

In some embodiments, the substrate is formed from a polymeric material. In some embodiments, the metal layer is bonded directly to the substrate.

According to some embodiments, the metal layer has a thickness in the range of from about 4 micrometers to 25 micrometers.

The reflector assembly may include at least one support member affixed to the substrate to support the reflector.

According to some embodiments, the metal layer is formed of a metal selected from the group consisting of copper, aluminum, silver, tin, nickel, and combinations thereof.

According to some embodiments, the metal layer has a thickness in the range of from about 0.004 mm to about 0.5 mm.

In some embodiments, the reflector assembly includes at least one support member affixed to the substrate to support the reflector.

According to some embodiments, the least one support member includes a pair of opposed support members affixed to the substrate to support the reflector.

In some embodiments, each of the support members defines a lengthwise channel or tubular passage.

In some embodiments, each of the support members includes cut outs defined therein.

According to some embodiments, the metal layer is coupled directly to the substrate.

According to some embodiments, the substrate includes integral stiffening features.

The metal layer can be at least partially patterned as patches and can be configured to define a frequency selective surface and/or substrate The base station antenna can include a plurality of columns of first radiating elements providing the radiating element and configured for operating in a first operational frequency band, each column of first radiating elements comprising a plurality of first radiating elements arranged in a longitudinal direction of the base station antenna. The nonmetallic substrate and the metal layer can cooperate to define at least one frequency selective surface configured such that electromagnetic waves within the first operational frequency band are substantially blocked by the reflector.

The frequency selective surface can be configured to reflect the electromagnetic waves within the first operational frequency band.

The base station antenna can further include at least one second radiating element configured for operating in a second operational frequency band that is different from and does not overlap with the first operational frequency band. The at least one frequency selective surface can be further configured such that electromagnetic waves within the second operational frequency band can propagate through the reflector.

The second operational frequency band can be higher than the first operational frequency band.

The nonmetallic substrate and the metal layer are provided by a multiple layer printed circuit board.

The nonmetallic substrate can include a dielectric board having opposite first and second sides, the first and second sides facing the radiating element and front of the base station antenna. The metal layer can be formed with a periodic conductive structure on at least one of the first and second sides. The periodic conductive structure can form a frequency selective surface.

The metal layer can be provided as a first periodic conductive structure on the first side of the dielectric board and a second periodic conductive structure on the second side of the dielectric board. The periodic conductive structure on the second side of the dielectric board can be different from the periodic structure on the first side of the dielectric board.

The periodic conductive structure can have a repeating pattern of polygonal patches of metal elements.

The nonmetallic substrate and the metal layer can be implemented as a multi-layer printed circuit board, one or more layers of which can be formed with a frequency selective surface configured such that electromagnetic waves within a first frequency range propagates through the reflector. The one or more layers of the multi-layer printed circuit board can reflect electromagnetic waves in a different operational frequency band.

The metal layer can have an array of conductive patches that merges into right and left outer perimeter sides that have full metal areas.

The base station antenna can also have feed boards that may be oriented perpendicular to the reflector extending longitudinally and residing on right and left sides of the reflector.

The base station antenna can also include at least one feed board on a right side perimeter of the reflector and at least one feed board on a left side perimeter of the reflector, each at least one feed board can reside adjacent to and behind or in front of the reflector.

The base station antenna can further include feed stalks that extend forward of the reflector positioning radiating elements thereon in front of the reflector facing a radome.

The metal layer can be formed as an in-mold decoration on or into the substrate.

The substrate can include an integral stiffening features that project forward. The radiating element can extend forward of the integral stiffening features.

The stiffening features can be provided as a plurality of laterally spaced apart and longitudinally extending ribs. At least one laterally extending rib can intersect at least some of the longitudinally extending ribs.

A plurality of mounting holes can extend through at least some of the ribs (in a front to back direction).

At least one primary surface of the longitudinally extending ribs that is orthogonal to a primary surface of the reflector can include a metal layer thereby providing an isolation fence extending between neighboring radiating elements of different linear arrays of radiating antenna elements.

Some embodiments are directed to methods of forming a reflector for a base station antenna. The methods include providing an injection molded substrate and metallizing a primary surface of the injection molded substrate thereby defining the reflector.

The metallizing can be carried out by electro-spraying a metal film onto the primary surface of the substrate.

Before the metallization, the method can further include roughening the primary surface of the injection molded substrate.

The method can further include heating the injection molded substrate, then cleaning the primary surface of the injection molded substrate prior to the metallization.

The metallization can be carried out to deposit a metal layer onto the primary surface of the substrate in a thickness that is in a range of about 0.004 mm and about 0.5 mm.

The metallization can be carried out using in-mold decoration.

The injection molded substrate can have a crisscross pattern of forwardly projecting ribs. The ribs can define rectangular planar regions therebetween thereby providing spaces for mounting radiating elements in the rectangular planar regions.

DESCRIPTION

Figure 1A:
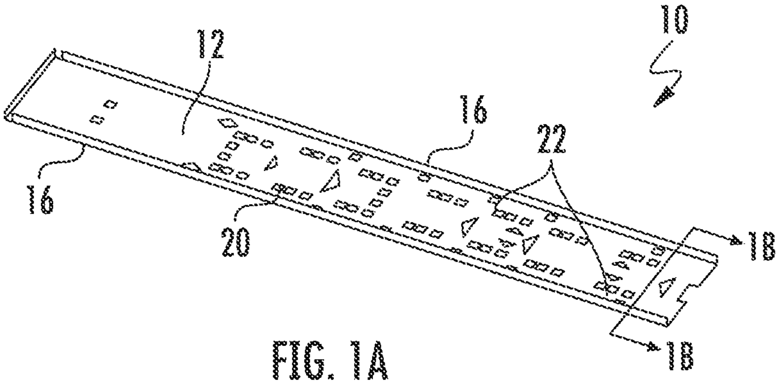
FIG. 1A PRIOR ART
FIG. 1A is a perspective view of a conventional reflector assembly for a base station antenna.
Figure 1B:
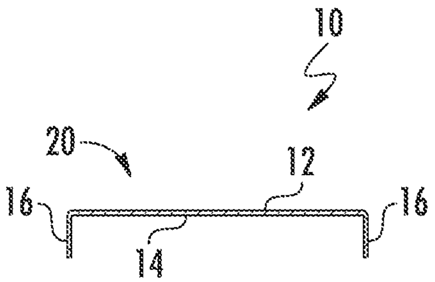
FIG. 1B PRIOR ART
FIG. 1B is a cross-sectional view taken along line 1B-1B of the reflector assembly of FIG. 1A.
Figure 2A:
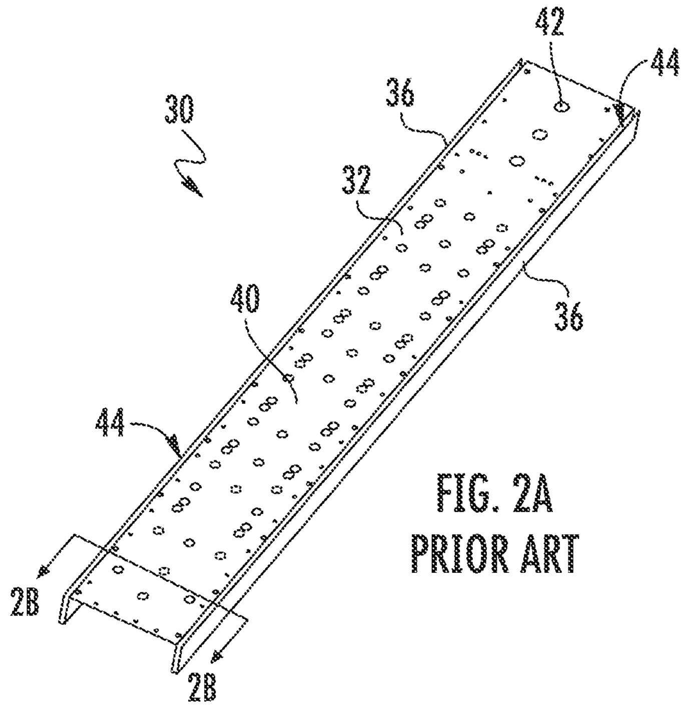
FIG. 2A PRIOR ART
FIG. 2A is a perspective view of another conventional reflector assembly for a base station antenna that includes integrated RF chokes.
Figure 2B:
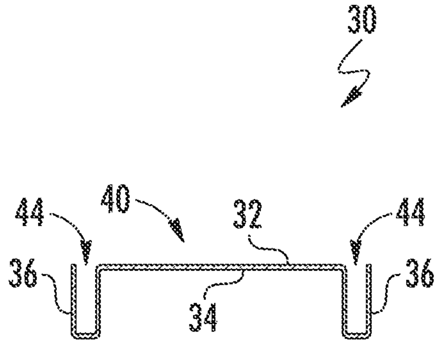
FIG. 2B PRIOR ART
FIG. 2B is a cross-sectional view taken along line 2B-2B of the reflector assembly of FIG. 2A.

The demand for cellular communications capacity has been increasing at a high rate. As a result, the number of base station antennas has proliferated in recent years. Base station antennas are both relatively large and heavy and, as noted above, are typically mounted on antenna towers. Due to the wind loading on the antennas and the weight of the antennas and associated radios, cabling and the like, antenna towers must be built to support significant loads. This increases the cost of the antenna towers.

The reflector assembly and the radome of a typical base station antenna may account for on the order of 40-50% of the total weight of a base station antenna. If the weight of the reflector assembly may be reduced, it may be possible to mount more base station antennas on a given antenna tower and/or to build new antenna towers that have lower structural loading requirements.

Pursuant to embodiments of the present invention, base station antennas are provided that include a reflector assembly having a composite or multi-layer reflector. The composite reflector includes a substrate formed of a dielectric material, and an RF electromagnetic reflector layer formed of metal mounted on the substrate. The dielectric substrate provides structural support for the metal layer, while reducing overall weight as compared to a reflector formed entirely of metal (e.g., bent sheet metal).

Embodiments of the present invention will now be discussed in greater detail with reference to the attached figures.

With reference to FIGS. 3-9; a base station antenna 100 according to some embodiments is shown therein. The base station antenna 100 includes a radome 110 and an antenna assembly 120 disposed in the radome 110. The antenna assembly 120 includes a reflector assembly 151 and radiating elements 130, 140. The reflector assembly 151 is constructed in accordance with some embodiments of the invention and includes a reflector 150 and support members 180. The reflector 150 includes a dielectric, non-metallic substrate 160 and a metal layer 170 (which serves as an RE electromagnetic reflector layer, as discussed in more detail below). In order to better illustrate the internal structure of base station antenna 100, in FIG. 4 the radome 110 and radome supports are omitted, and the radome 110 is omitted in FIG. 5.

In the description that follows, the base station antenna 100 and the components thereof are described using terms that assume that the base station antenna 100 is mounted for use on a tower with the longitudinal axis LA-LA of the antenna 100 extending along a vertical (or near vertical) axis and the front surface of the antenna 100 mounted opposite the tower pointing toward the coverage area for the antenna 100, even though FIGS. 3-6 do not depict the antenna 100 mounted in this configuration. Herein, the longitudinal direction refers to a direction that is perpendicular to the plane defined by the horizon, and the transverse direction refers to a direction that is parallel to the horizon and that extends from the center of the main reflective surface of the antenna being described towards the sides thereof.

Figure 3:
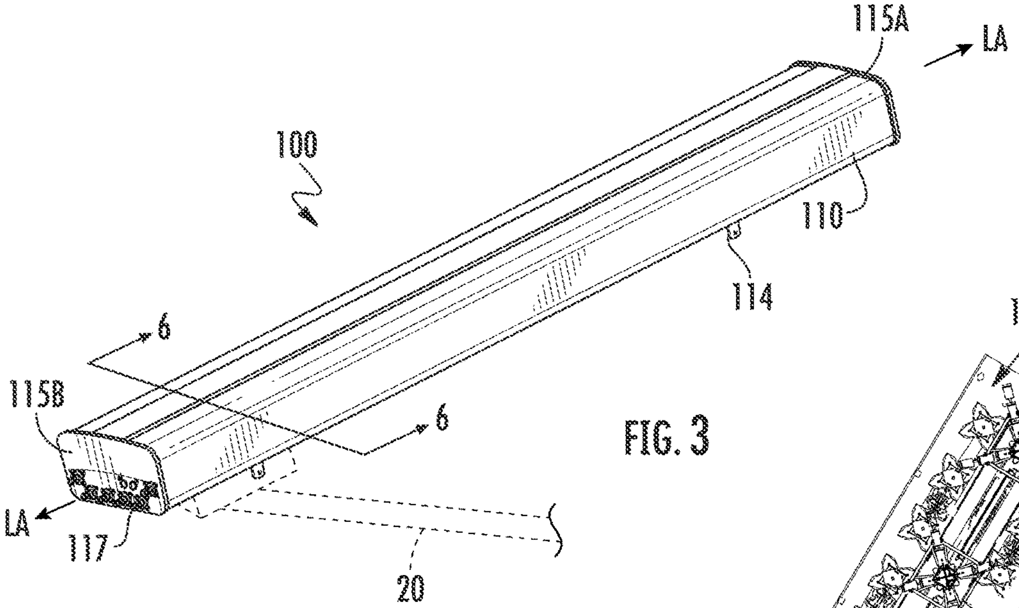
FIG. 3 is a perspective view of a base station antenna according to some embodiments of the invention.

As shown in FIG. 3, the base station antenna 100 is an elongated structure and may have a generally rectangular shape. The antenna 100 includes a radome 110, a top end cap 115A, a bottom end cap 115B, and a radome support 112. The radome 110 defines an internal cavity or chamber 116 that receives the antenna assembly 120. The radome 110 may comprise a hollow, generally rectangular tube with a bottom opening, and may be of conventional design. The bottom end cap 115B may cover the bottom opening of radome 110. The radome 110 may be made of, for example, fiberglass. In some embodiments, the top end cap 115A and the radome 110 may comprise a single integral unit, which may be helpful for waterproofing the antenna 100. One or more mounting brackets 114 are provided on the back side of the antenna 100 which may be used to mount the antenna 100 onto an antenna mount (not shown) on, for example, an antenna tower. The bottom end cap 115B may include a plurality of connectors 117 mounted therein that receive cables that carry RF signals between base station antenna 100 and one or more associated radios. The antenna 100 is typically mounted in a vertical configuration (i.e., the long side of the antenna 100 extends along a vertical axis with respect to the horizon).

Figure 4:
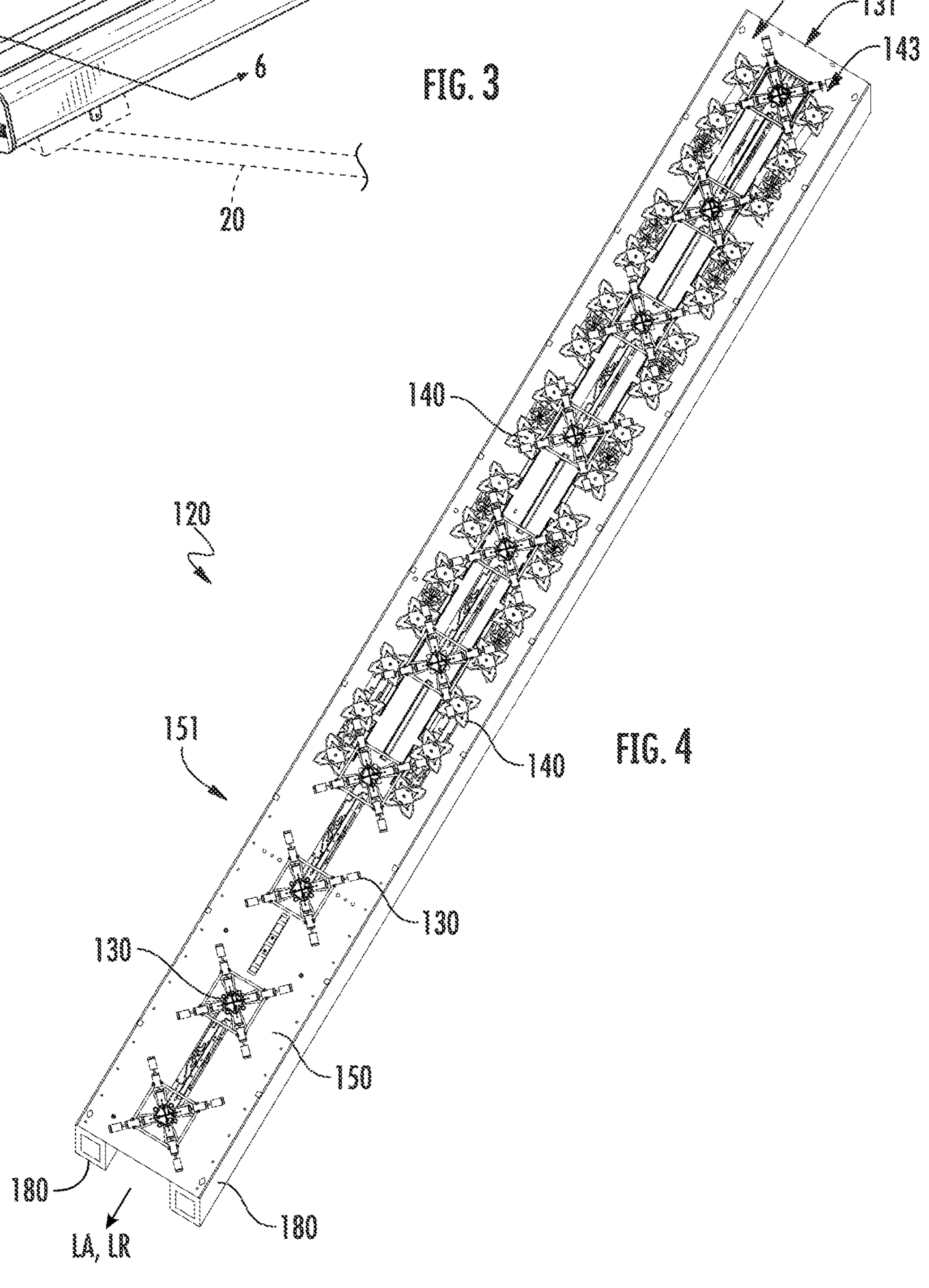
FIG. 4 is a front perspective view of an antenna assembly forming a part of the base station antenna of FIG. 3.

FIG. 4 is a front view of the antenna assembly 120 (i.e., the base station antenna 100 with the radome 110 and radome supports 112 removed). While omitted in FIG. 4 to better illustrate the radiating elements, it will be appreciated that the antenna assembly 120 also includes a plurality of radome supports such as the radome support 112 shown in FIG. 3D. The antenna assembly 120 may be slidably inserted into the radome 110 through the bottom opening thereof.

Referring to FIG. 4, the antenna assembly 120 includes a reflector assembly 151, a plurality of low band radiating elements 130, and a plurality of high band radiating elements 140. Various mechanical and electronic components such as, for example, phase shifters, remote electronic tilt ("RET") units, mechanical linkages, diplexers, and the like (not shown) may be mounted behind the reflector assembly 151.

Figure 6:
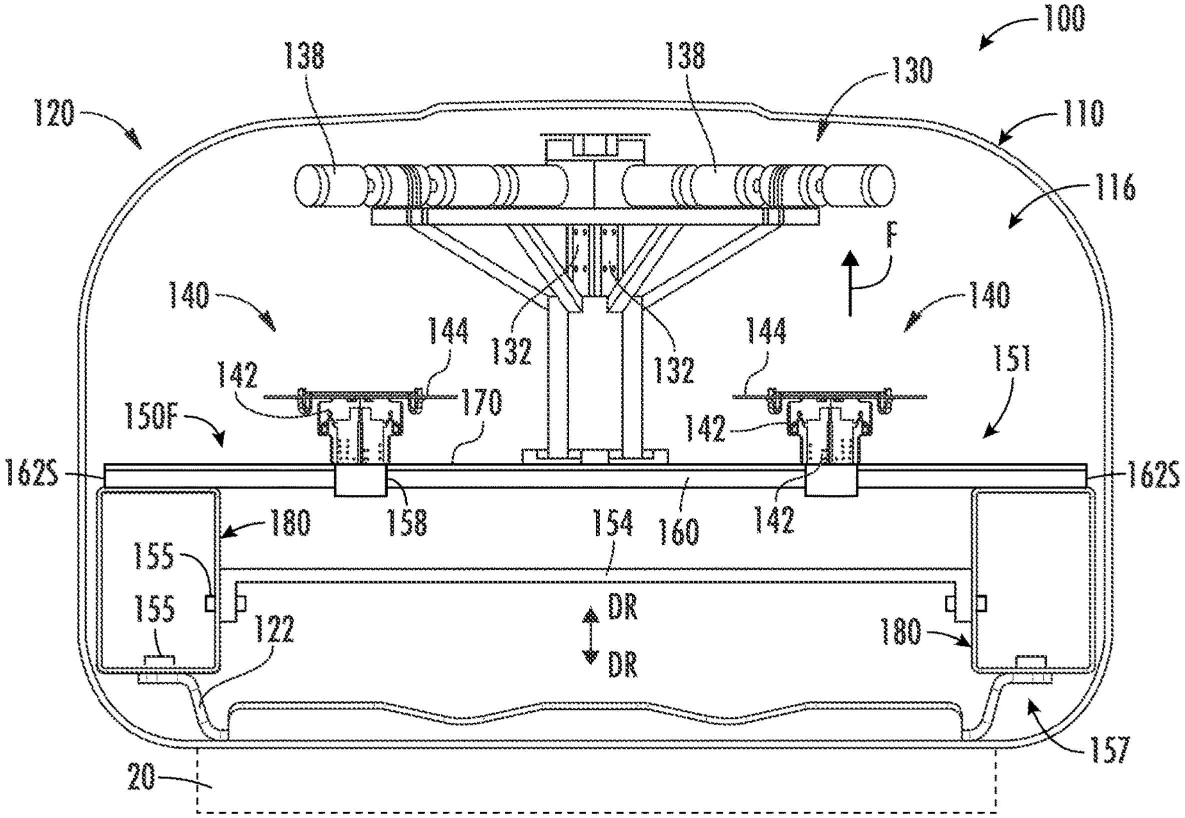
FIG. 6 is a cross-sectional view of the base station antenna of FIG. 3 taken along the line 6-6 of FIG. 3.
Figure 7:
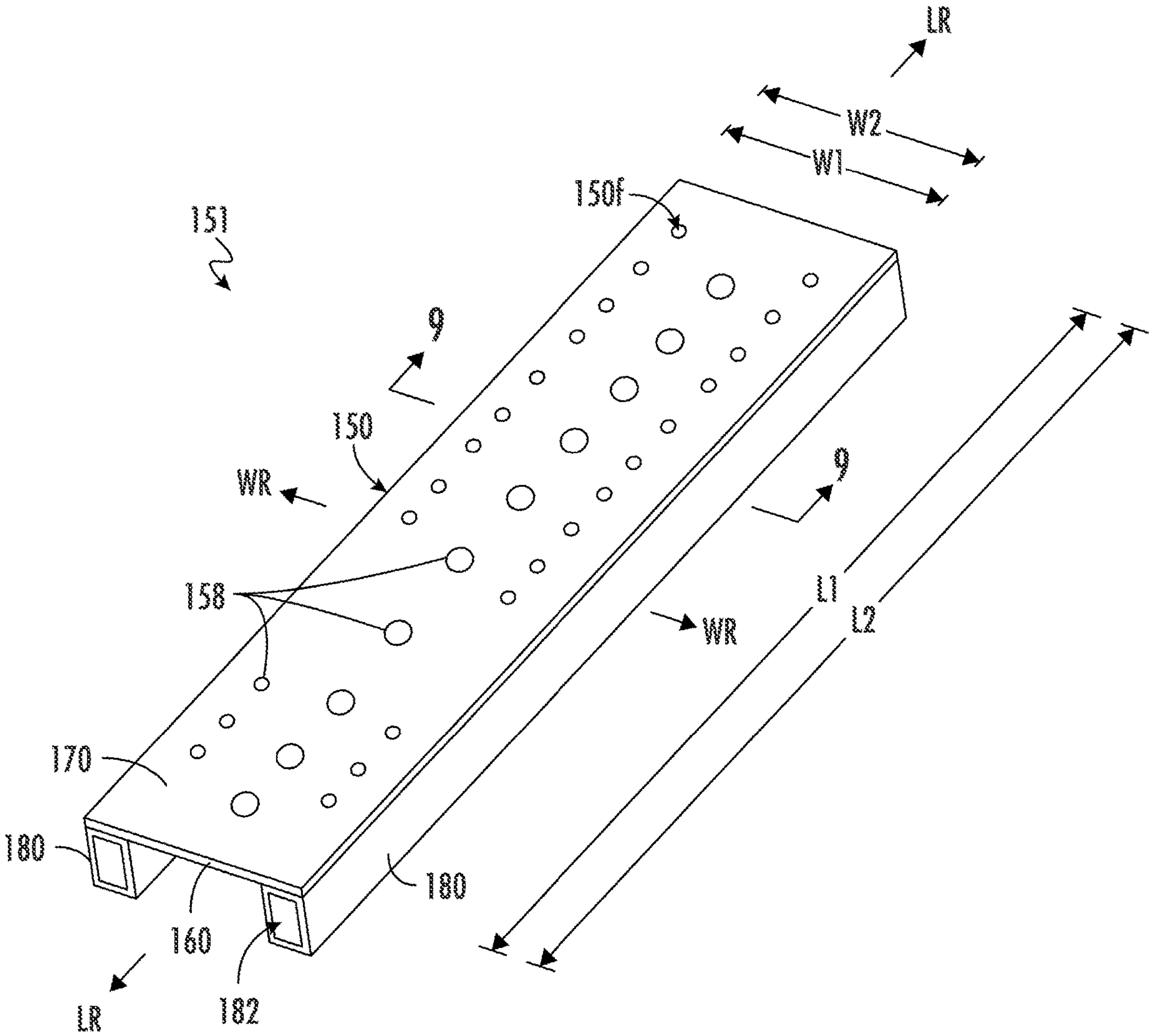
FIG. 7 is a front perspective view of a reflector assembly forming a part of the antenna assembly of FIG. 4.

With reference to FIGS. 6-9, the reflector assembly 151 includes a reflector body or reflector 150, a pair of opposed support members 180, and a plurality of spaced-apart support brackets or cross braces 154 (only one of which is visible in FIG. 6). The reflector assembly 151 has a longitudinal axis LR-LR (FIG. 7), a lateral or widthwise axis WR-WR extending perpendicular to the longitudinal axis LR-LR, and a second lateral or depthwise axis DR-DR (FIG. 6) extending perpendicular to the longitudinal axis LR-LR and the widthwise axis WR-WR. The longitudinal axis LR-LR may extend substantially parallel to the antenna longitudinal axis LA-LA.

The reflector 150 has a front side 150F. The reflector 150 includes a non-metallic substrate 160 and a metal layer 170. The reflector 150 may also include mounting holes or openings 158 defined therein and extending through each of the non-metallic substrate 160 and the metal layer 170.

Figure 8:
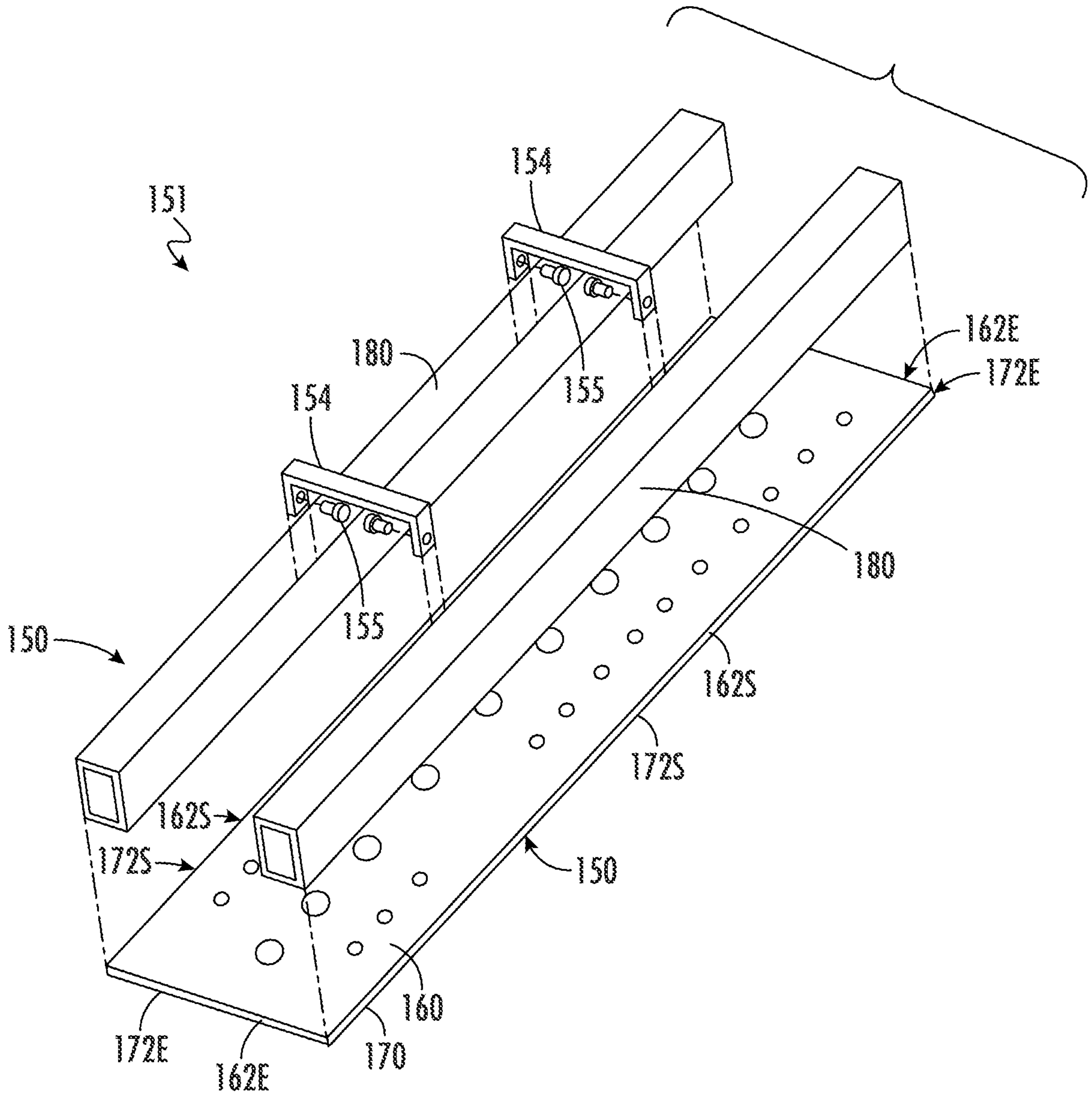
FIG. 8 is an exploded, rear perspective view of the reflector assembly of FIG. 7.
Figure 9:
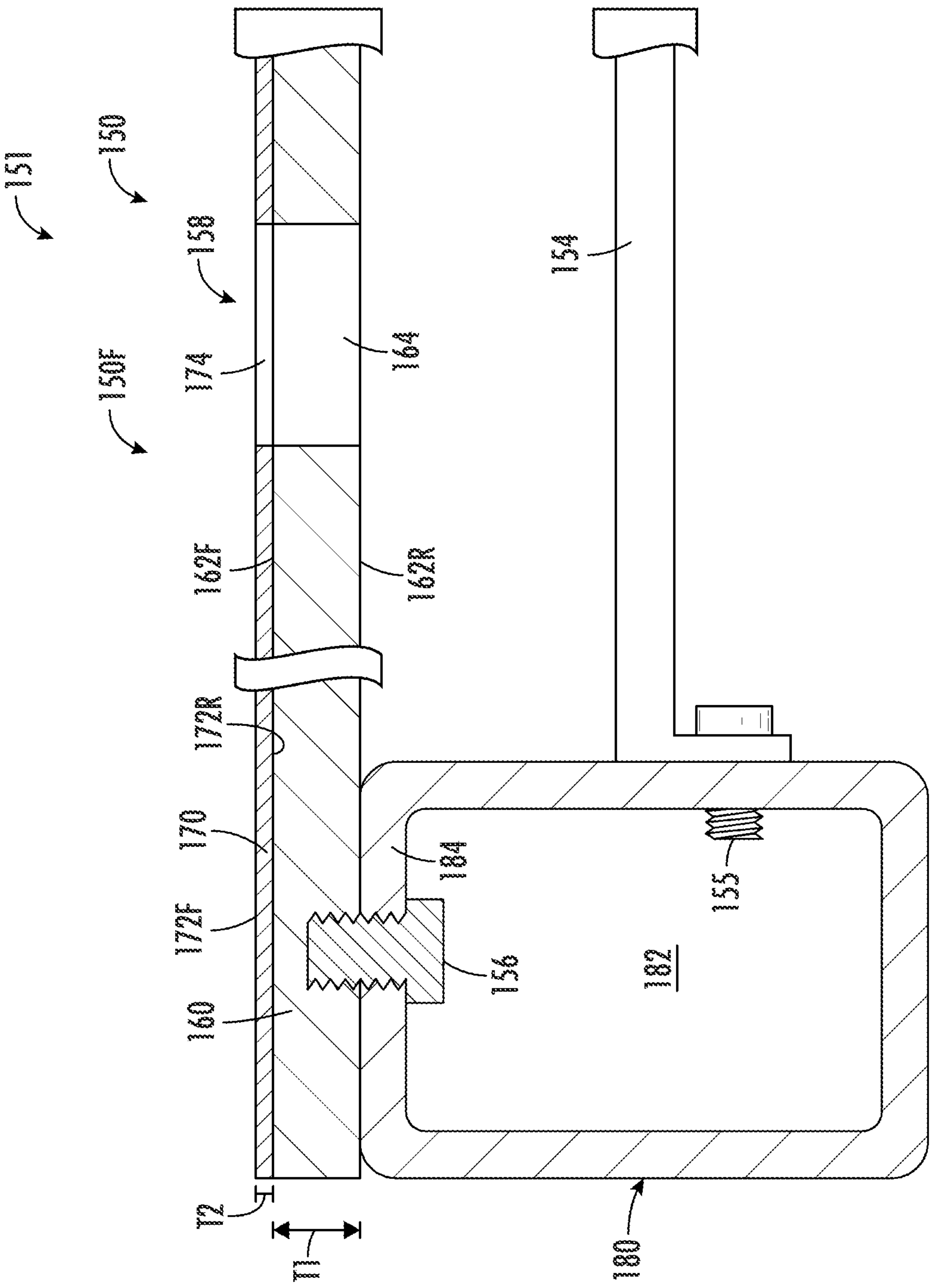
FIG. 9 is an enlarged, fragmentary, cross-sectional view of the reflector assembly of FIG. 7 taken along the line 9-9 of FIG. 7.

The substrate 160 has a front surface 162F and an opposing rear surface 162R (FIG. 9), bounded by opposed lateral side edges 162S and opposed end edges 162E (FIG. 8). In some embodiments, the front surface 162F is substantially planar.

Openings 164 (FIG. 9) extend depthwise through the substrate 160 and each form a part of a respective reflector opening 158.

In some embodiments, the substrate 160 has a thickness T1 (FIG. 9) in the range of from about 1.6 mm to 3 mm.

The substrate 160 is formed of a nonmetallic, dielectric material. In some embodiments, the substrate 160 is formed of a plastic or polymeric material. In some embodiments, the substrate 160 is formed of a thermoplastic. In some embodiments, the substrate 160 is formed of a fiberglass reinforced thermoplastic composite. Suitable thermoplastics may include fiberglass reinforced plastic (e.g., 40-50% content of fiberglass), fiberglass reinforced Nylon (softer), or acrylonitrile styrene acrylate (ASA) plastic. In some embodiments, the substrate 160 is formed of sheet molding compound (SMC) fiberglass.

In some embodiments, the substrate 160 is formed of a thermoplastic having a tensile strength in the range of from about 40 to 60 MPa.

In some embodiments, the substrate 160 is formed of a thermoplastic having a surface electrical resistivity in the range of from about $1.59\times10^{-8}$ to $1.09\times10^{-7}$ ohm-meter (Ω·m).

In some embodiments, the substrate 160 is unitary. In some embodiments, the substrate 160 is monolithic.

The substrate 160 may be formed using any suitable technique. In some embodiments, the substrate 160 is molded (e.g., injection molded). In some embodiments, the substrate 160 is extruded or otherwise formed as a sheet (which may have ribs or other non-planar structures formed therein, as discussed below), and then cut to length or shape.

The metal layer 170 has a front surface 172F and an opposing rear surface 172R, bounded by opposed lateral side edges 172S and opposed end edges 172E. In some embodiments, the front surface 172F is substantially planar.

Openings 174 (FIG. 9) extend depthwise through the metal layer 170 and each form a part of a respective reflector opening 158.

In some embodiments, the metal layer 170 has a thickness T2 (FIG. 9) that is less than 25 micrometers and, in some embodiments, less than 10 micrometers. In some embodiments, the thickness T2 is in the range of from about 4 micrometers to 25 micrometers. In some embodiments, the thickness T2 of the metal layer 170 is substantially uniform throughout the area bounded by the edges 172S, 172E (with the exception of the openings 174).

In some embodiments, the thickness T2 can be either in a range of about 0.004 mm to about 0.5, such as, for example about 0.1 mm.

The metal layer 170 is formed of metal. In some embodiments, the metal layer 170 is formed of aluminum or aluminum alloy. In some embodiments, the metal layer 170 is formed of one or more of copper, aluminum, silver, tin, nickel, or combinations or alloys thereof.

In some embodiments, the metal layer 170 is formed of a metal having an electrical conductivity in the range of from about $9\times10^{6}$ to $6.3\times10^{7}$ seimens per meter (S/m).

In some embodiments, the metal layer 170 is unitary. In some embodiments, the metal layer 170 is monolithic.

The metal layer 170 is secured to the substrate 160. In some embodiments, the metal layer 170 is bonded to the substrate 160. In particular, in some embodiments the rear surface 172R is bonded to the front surface 162F of the substrate 160. In some embodiments the rear surface 172R is directly bonded to the front surface 162F of the substrate 160 without an intervening adhesive (e.g., using heat bonding). In some embodiments the rear surface 172R is directly bonded to the front surface 162F of the substrate 160 by an intervening adhesive. In some embodiments, the metal layer 170 is a coating on the substrate 160.

The metal layer 170 may be formed and secured to the substrate 160 using any suitable technique. In some embodiments, the substrate 160 is preformed, and the metal layer 170 is thereafter applied and bonded to the substrate 160. Suitable methods for applying the metal layer 170 to the substrate 160 may include coating the substrate 160 with the metal 170, for example, by spraying, dipping, painting, plating, or flooding. Suitable methods for applying the metal layer 170 to the substrate 160 may also include laminating the metal 170 onto the substrate 160. In some embodiments, the metal layer 170 is co-laminated, coextruded, or co-molded (e.g., insert molded or thermoformed) with the substrate 160. In some embodiments, the layers 160, 170 are combined in a larger or extended panel or web, and the individual reflectors 150 are cut therefrom.

In some embodiments, the width W1 (FIG. 7) of the substrate 160 is substantially the same as the width W2 of the metal layer 170, and the length L1 (FIG. 7) of the substrate 160 is substantially the same as the length L2 of the metal layer 170, so that the front surfaces 162F and 172F are substantially coextensive.

In some embodiments, the width W2 of the metal layer 170 is in the range of from about 300 mm to 650 mm. In some embodiments, the length L2 of the metal layer 170 is in the range of from about 1400 mm to 3000 mm.

In some embodiments, the surface area of the front surface 172F of the metal layer 170 is in the range of from about 0.4 $m^2$ to 2 $m^2$.

Each support member 180 is elongate and includes a front section or wall 184. In some embodiments, each support member 180 defines a lengthwise channel or passage 182. In some embodiments, each support member 180 is tubular.

The support members 180 may be formed of any suitable material. In some embodiments, the support members 180 are formed of a metal, such as aluminum.

The support members 180 may be formed using any suitable technique. In some embodiments, each support member 180 is extruded. For example, in some embodiments, each support member 180 is extruded as a straight, tubular member or stock, which may then be cut to length. In some embodiments, each support member 180 is unitary. In some embodiments, each support member 180 is monolithic.

Each support member 180 is affixed to the rear side 162R of the substrate 160 along or adjacent a respective one of the side edges 162S. In some embodiments, each support member 180 is affixed to the substrate 160 by fasteners 156 (e.g., screws, bolts, or nuts and bolts); however, other techniques may be used.

The cross braces 154 are connected or affixed at either end to the support members 180 (e.g., fasteners 155; FIG. 6) and span the lateral distance between the support members 180. The support members 180 and the cross braces 154 collectively form a frame 157.

The cross braces 154 may be formed of any suitable material. In some embodiments, the cross braces 154 are formed of a metal, such as aluminum. In some embodiments, the cross braces 154 are formed of plastic.

The frame 157 is connected to the radome 110 by support brackets 122. In some embodiments, the support brackets 122 are affixed to the support members 180 (e.g., by fasteners 155; FIG. 6).

As is further shown in FIG. 4, the radiating elements 130, 140 are mounted to extend forwardly from the reflector assembly 151. In some embodiments, the radiating elements 130 and/or the radiating elements 140 mounted to the reflector assembly 151 in or using the openings 158. Various other elements may also be attached to reflector 150 using the openings 158, such as, for example, feed boards (which the radiating elements may be mounted on), decoupling structures, isolation structures and/or structural supports may be mounted in the openings 158. Attachment structures (e.g., screws, rivets and the like) may be used to attach various elements/structures to the reflector 150.

The low band radiating elements 130 are mounted along a first vertical axis (e.g., substantially parallel to the axis LR-LR) to form a linear array 131 of low band radiating elements 130. The high band radiating elements 140 may be divided into two groups that are mounted along respective second and third vertical axes to form a pair of linear arrays 141, 143 of high band radiating elements 170. The linear array 131 of low band radiating elements 130 extends between the two linear arrays 141, 143 of high band radiating elements 140. The low band radiating elements 130 may be configured to transmit and receive signals in a first frequency band. In some embodiments, the first frequency band may be the 694-960 MHz frequency band or a portion thereof. In other embodiments, the first frequency band may be the 555-960 MHz frequency band or a portion thereof. In other embodiments, the first frequency band may be the 575-960 MHz frequency band, the 617-960 MHz frequency band, the 694-960 frequency band or portions of any thereof. The high band radiating elements 140 may be configured to transmit and receive signals in a second frequency band. In some embodiments, the second frequency band may be the 1.695-2.690 GHz frequency range or a portion thereof.

Figure 5:
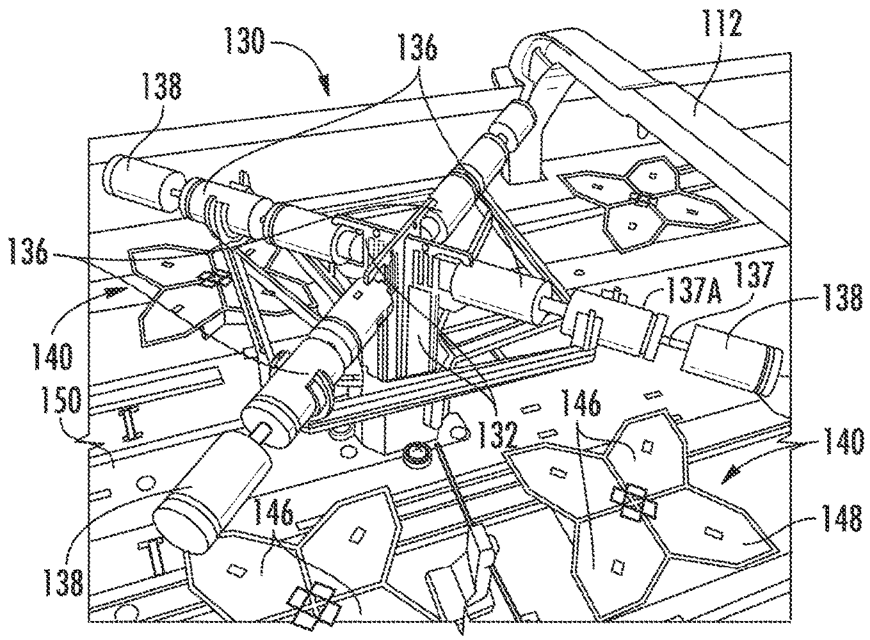
FIG. 5 is an enlarged, fragmentary, perspective view of the antenna assembly of FIG. 4.

FIGS. 5 and 6 illustrate the design of the radiating elements 130, 140 in greater detail. As shown in FIGS. 5 and 6, each low band radiating element 130 includes a pair of feed stalk printed circuit boards 132, a dipole support 134 and four dipole arms 138 that form a pair of crossed dipole radiators 136. Each feed stalk printed circuit board 132 may include an RF transmission line that is part of the transmission path between each dipole radiator 136 and respective ports of a radio. Each dipole arm 138 may comprise an elongated center conductor 137 that has a series of coaxial chokes 137A mounted thereon. Each coaxial choke 137A may comprise a hollow metal tube that has an open end and a closed end that is grounded to the center conductor 137. Each dipole arm 138 may be, for example, between a ⅜ to ½ of a wavelength in length, where the "wavelength" refers to the wavelength corresponding to the center frequency of the low band. The dipole arms 138 may be arranged as two pairs of commonly fed collinear dipole arms 138. The dipole arms 138 of the first pair are commonly fed from a first of the feed stalk printed circuit boards 132 to form a first dipole radiator 136 that is configured to transmit and receive RF signals having a +45 degree polarization. The other pair of collinear dipole arms 138 are commonly fed from the second of the feed stalk printed circuit boards 152 to form a second dipole radiator 156 that is configured to transmit and receive RF signals having a −45 degree polarization. The dipole radiators 136 may be mounted approximately a quarter wavelength in front of the main reflective surface 172F by the feed stalk printed circuit boards 132. The dipole support 134 may comprise, for example, a plastic support that helps hold the dipole arms 138 in their proper positions.

As is also shown in FIGS. 4-6, each high band radiating element 140 includes a pair of feed stalk printed circuit boards 142 and a dipole printed circuit board 144 that has four dipole arms 148 formed thereon that form a pair of crossed dipole radiators 146. Each feed stalk printed circuit board 142 may include an RF transmission line that is part of the transmission path between each dipole radiator 146 and respective ports of a radio. Each dipole arm 148 may comprise a generally leaf-shaped conductive region on the dipole printed circuit board 144. A first pair of the dipole arms 148 are commonly fed from a first of the feed stalk printed circuit boards 142 to form a first dipole radiator 146 that is configured to transmit and receive RF signals having a +45 degree polarization. The remaining two dipole arms 148 are commonly fed from the second of the feed stalk printed circuit boards 172 to form a second dipole radiator 146 that is configured to transmit and receive RF signals having a −45 degree polarization. The dipole radiators 146 may be mounted approximately a quarter wavelength in front of the reflective surface 172F by the feed stalks 142, where the "wavelength" refers to the wavelength corresponding to the center frequency of the high band.

As shown best in FIGS. 5 and 6, the low band radiating elements 130 and the high band radiating elements 140 are mounted on the reflector assembly 151 and extend forwardly therefrom. FIG. 5 also illustrates a plastic radome support 112 that abuts the inner surface of the radome 110 when the antenna assembly 120 is installed within the radome 110. It will be appreciated that other types of radiating elements may be used, that more or fewer linear arrays may be included in the antenna, that the number of radiating elements per array may be varied, and that planar arrays or staggered linear arrays may be used instead of the "straight" linear arrays illustrated in the figures in other embodiments.

In use, the base station antenna 100 may be mounted on a suitable support such as a pole or other support structure, e.g., a support structure 20 as shown in FIGS. 3 and 6. In some embodiments, the support brackets 122 are affixed to the support structure 20, and the reflector assembly 151 is thereby affixed to the support structure 20. The antenna 100 is mounted on the support structure 20 such that the metal layer front surface 172F and the front side 150F of the reflector 150 face in a forward direction F (FIG. 6).

The metal layer 170 of the reflector 150 is electromagnetically reflective. In use, the metal layer 170 serves to reflect RF energy from the radiating elements 130, 140 in the forward direction (e.g., in the same or similar manner as conventional bent metal plate reflectors). The metal layer 170 can also serve as a ground plane for the radiating elements 130, 140.

The substrate 160 provides structural rigidity and support to the reflector 150 and the metal layer 170. Moreover, the substrate 160 and the frame 157 (i.e., the support members 180 and the cross braces 154) cooperate to provide structural rigidity and support to the reflector 150 and the overall reflector assembly 151. In particular, the substrate 160 the support members 180, and the cross braces 154 can provide the reflector assembly 151 with good torsional stability. The cross braces 154 extending between support members 180 of the reflector assembly 151 provide mechanical support. This structural strength enables the reflector 150 to serve effectively as a support or carrier for other components, such as the radiating elements 130, 140.

The substrate 160 can be formed of a relatively weak plastic instead of as a heavy metal structure because the geometry of the frame 157 and the substrate 160 provides the aforementioned strength and stiffness.

The reflector 150 can be mounted on a support such as a metal pole via the support members 180. When the support members 180 are formed of metal (e.g., steel), they can reduce or prevent problems that may otherwise be caused by a difference between the thermal expansion rate of the pole and the thermal expansion rate of the substrate 160.

Because the metal layer 170 is primarily or only relied upon for electrical performance (e.g., RF reflectance and/or ground plane) rather than support, the metal layer 170 can be formed as a relatively thin layer or coating. This can reduce the overall weight of the reflector assembly 151 as compared to conventional bent metal reflectors. The use of a thin metal layer or coating can also reduce the manufacturing cost of the reflector assembly 151 as compared to conventional bent metal reflectors.

The metal layer 170 may be connected to electrical ground using a direct electrical connection. Alternatively, the metal layer 170 may be connected to electrical ground using a capacitive electrical connection through the substrate 160 to the metal layer 170.

Figure 10:
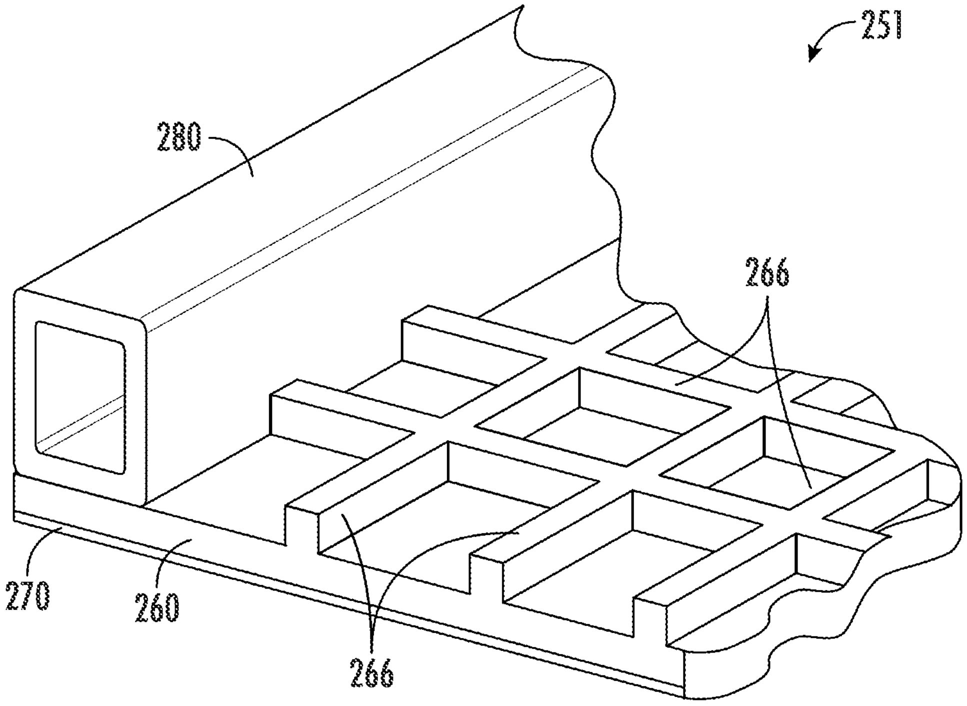
FIG. 10 is an enlarged, fragmentary, rear perspective view of a reflector assembly according to further embodiments.

With reference to FIG. 10, a reflector assembly 251 according to further embodiments is shown therein. The reflector assembly 251 may be constructed and used in the same manner as the reflector assembly 151. The reflector assembly 251 includes a substrate 260, a metal layer 270, and support members 280 corresponding to the substrate 160, the metal layer 170, and the support members 180, respectively.

The reflector assembly 251 differs from the reflector assembly 151 in that the substrate 260 is further provided with integral geometric stiffening structures or features 266. The stiffening features 266 may take the form of integral, upstanding ribs or corrugations, for example. In some embodiments, the stiffening features 266 protrude from the rear side of the substrate 260 so that the front surface of the substrate 260 remains substantially planar. In some embodiments, the substrate 260, including the stiffening features 266, is monolithic.

Figure 11:
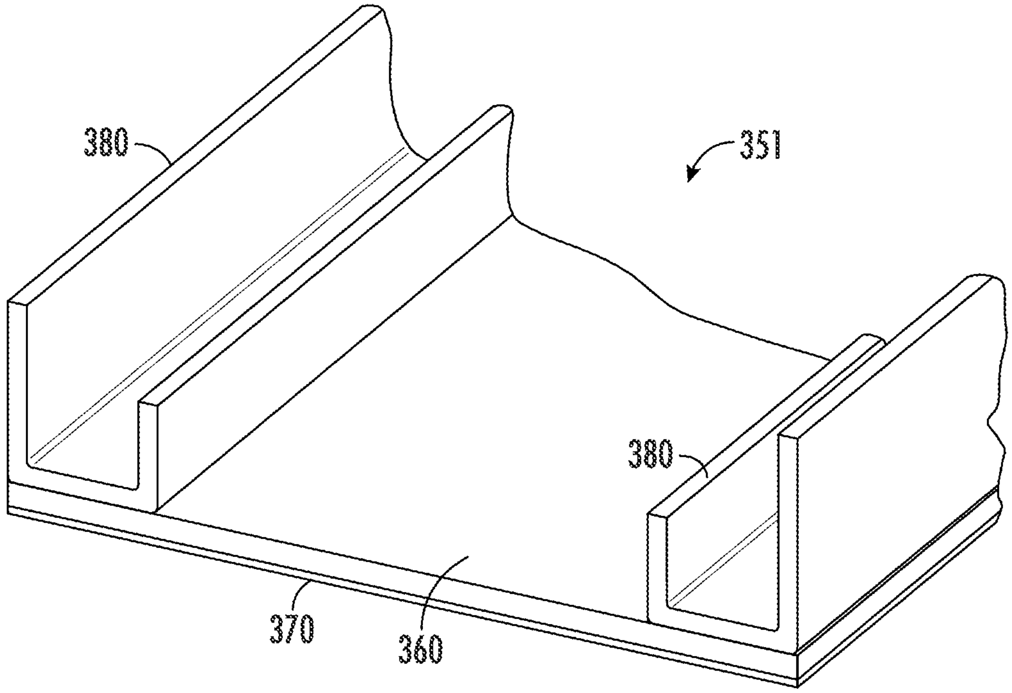
FIG. 11 is an enlarged, fragmentary, rear perspective view of a reflector assembly according to further embodiments.

With reference to FIG. 11, a reflector assembly 351 according to further embodiments is shown therein. The reflector assembly 351 may be constructed and used in the same manner as the reflector assembly 151. The reflector assembly 351 includes a substrate 360, a metal layer 370, and support members 380 corresponding to the substrate 160, the metal layer 170, and the support members 180, respectively.

The reflector assembly 351 includes support members 380 corresponding to the support members 180, except as follows. Each support member 380 is U-shaped or J-shaped in cross-sectional profile. This geometric structure may provide sufficient rigidity to the reflector assembly 351 while further reducing weight and cost.

Figure 12:
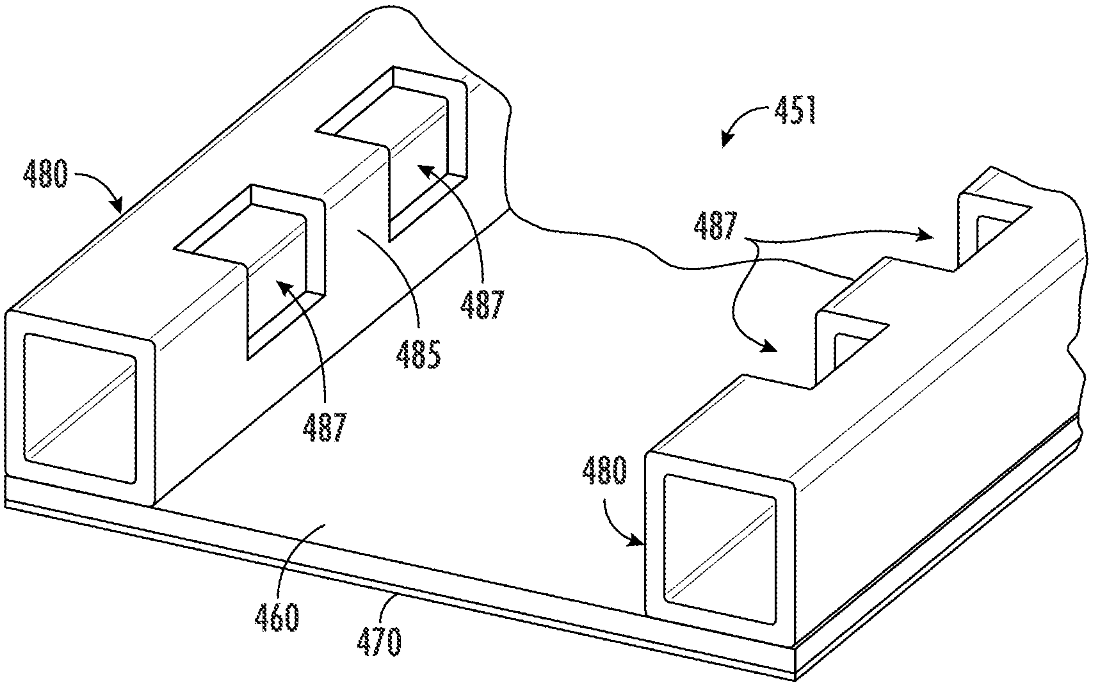
FIG. 12 is an enlarged, fragmentary, rear perspective view of a reflector assembly according to further embodiments.

With reference to FIG. 12, a reflector assembly 451 according to further embodiments is shown therein. The reflector assembly 451 may be constructed and used in the same manner as the reflector assembly 151. The reflector assembly 451 includes a substrate 460, a metal layer 470, and support members 480 corresponding to the substrate 160, the metal layer 170, and the support members 180, respectively.

The reflector assembly 451 includes support members 480 corresponding to the support members 180, except as follows. Each support member 480 includes side cutouts 487 in its side walls 485. This geometric structure may provide sufficient rigidity to the reflector assembly 451 while further reducing weight and cost.

Figure 13:
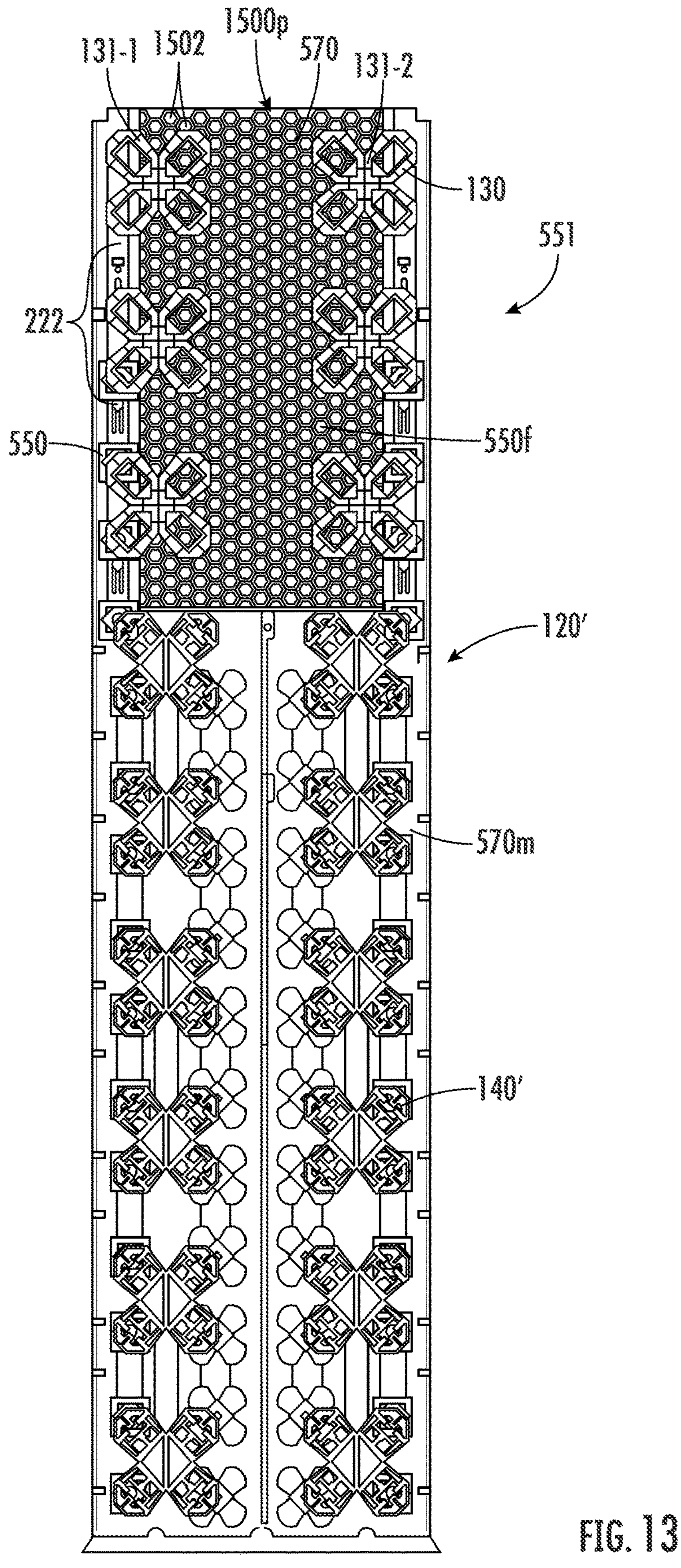
FIG. 13 is a front view of a reflector assembly according to further embodiments.
Figure 14:
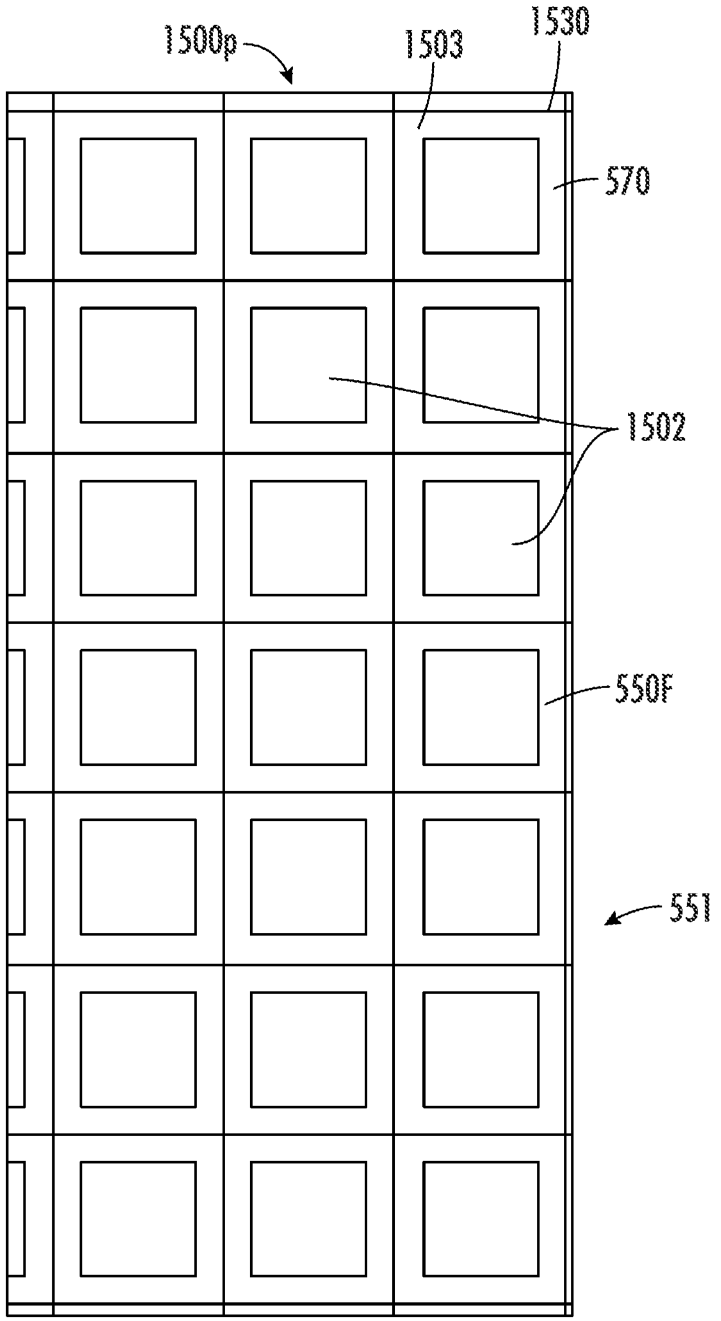
FIG. 14 is a front view of an example reflector of the reflector assembly shown in FIG. 13.

With reference to FIGS. 13 and 14, a reflector assembly 551 according to further embodiments is shown therein. The reflector assembly 551 may be constructed and used in the same or similar manner as the reflector assembly 151. The reflector assembly 551 includes a reflector 550 provided by a substrate 560 and at least one metal layer 570. The substrate 560 may be similar to the substrate 160 and the at least one metal layer 570 may be similar to the metal layer 170, respectively. The reflector assembly 551 differs from the reflector assembly 151 as the at least one metal layer 570 is provided to define a frequency selective surface or surfaces ("FSS") 550F. See, e.g., Ben A. Munk, Frequency Selective Surfaces: Theory and Design, ISBN: 978-0-471-37047-5; DOI:10.1002/0471723770; April 2000, Copyright© 2000 John Wiley & Sons, Inc. the contents of which are hereby incorporated by reference as if recited in full herein.

Referring to FIGS. 13, 14, 15A, and 15B, the at least one metal layer 570 may comprise a pattern 1500*p* of metal patches 1502. The at least one metal layer 570 cooperates with the non-metallic substrate 560 and may be one or more metal layers that are deposited or otherwise formed on one or more surfaces of the non-metallic substrate 560. Thus, base station antennas can be configured to have respective reflector assemblies 551 that have a nonmetallic substrate 560 with at least one metal layer 570 coupled to and/or mounted thereon that is partially or fully patterned to have an FSS 550F that provides frequency selective characteristics.

Figure 16A:
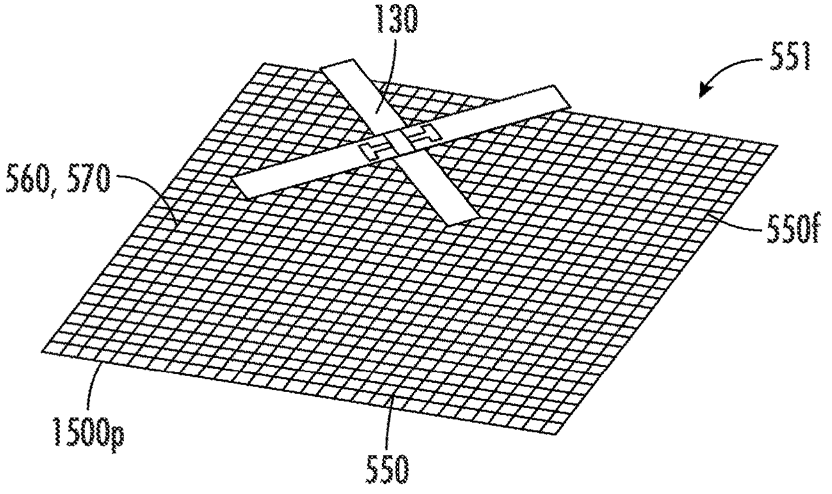
FIG. 16A is a side perspective view of an example reflector and antenna element according to further embodiments.
Figure 16B:
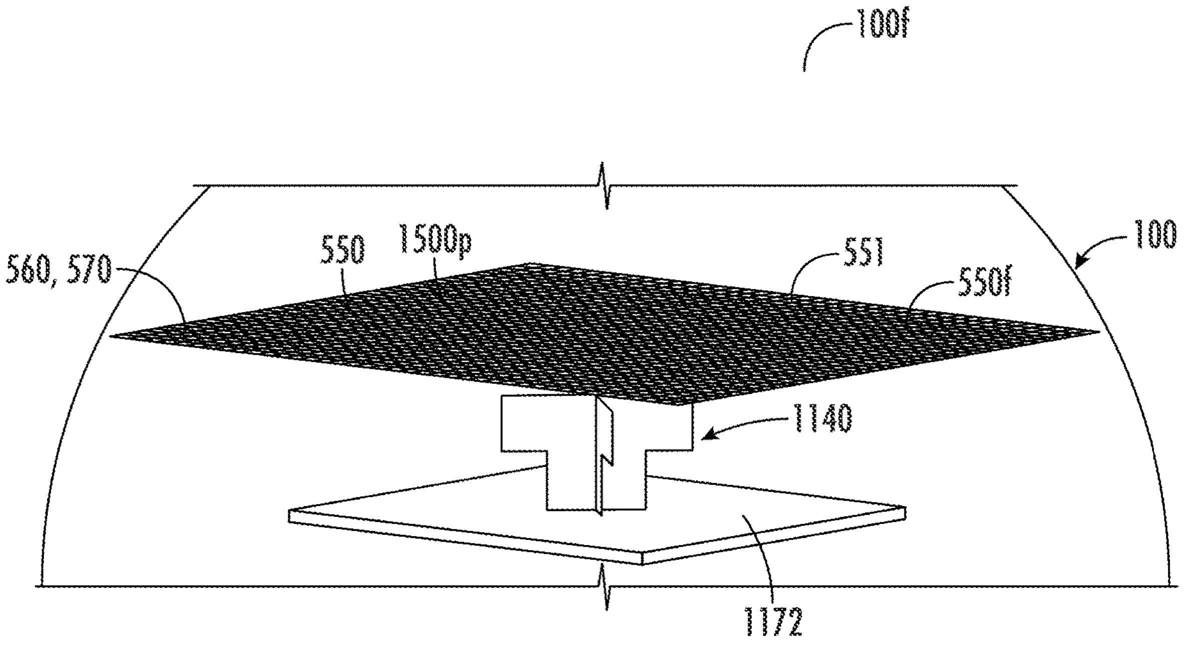
FIG. 16B is an enlarged side perspective view of the example reflector shown in FIG. 16A in combination with another reflector according to further embodiments.

Referring to FIGS. 16A, 16B, the reflector 550 can reside behind at least some first antenna elements 130 and forward of other antenna elements 1140. The first antenna elements may be configured to operate in one frequency band and the other antenna elements 1140 may be configured to operate in a different frequency band from the first antenna elements 130 (FIG. 16B). The reflector 550 can selectively reject RF energy at one or some frequency bands and permit RF energy in another frequency band or bands to pass therethrough by including the frequency selective surface and/or substrate to operate as a type of "spatial filter."

The at least one metal layer 570 can comprise a metamaterial. The term "metamaterial" refers to composite electromagnetic (EM) materials. Metamaterials may comprise subwavelength periodic microstructures.

Figure 15A:
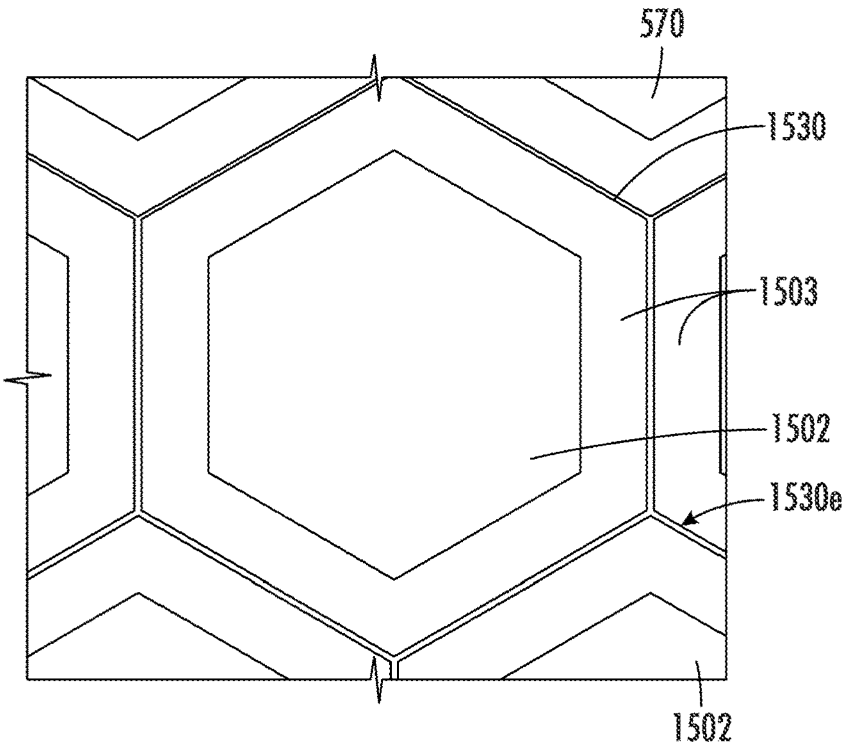
FIG. 15A is a greatly enlarged, partial front view of another example reflector of the reflector assembly shown in FIG. 13.
Figure 15B:
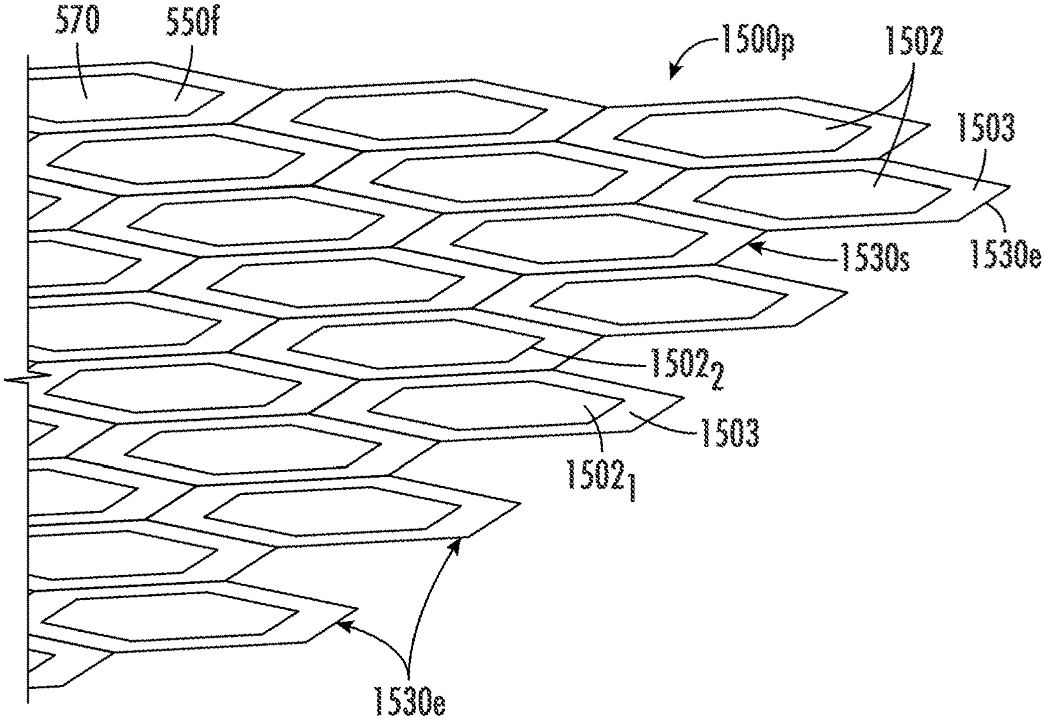
FIG. 15B is an enlarged, side perspective partial view of the example reflector shown in FIG. 15A.
Figure 15C:
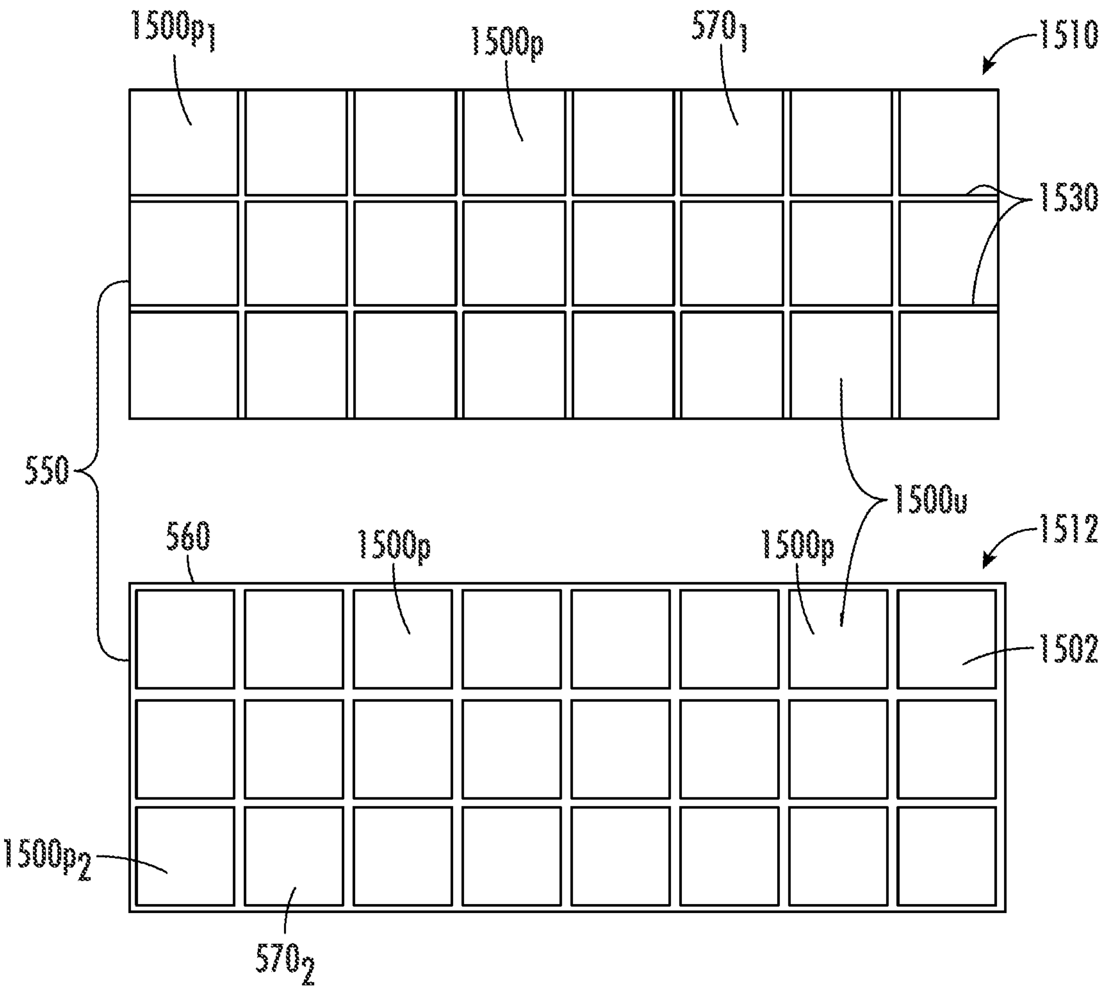
FIG. 15C is a front view of another example reflector of the reflector assembly shown in FIG. 13.
Figure 15D:
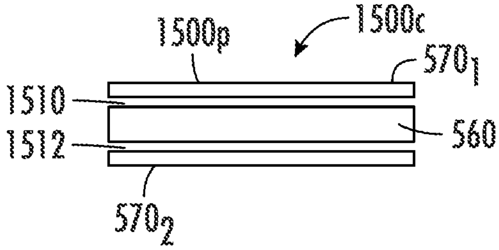
FIG. 15D is end view of the reflector shown in FIG. 15C.

Referring to FIGS. 15C and 15D, the at least one metal layer 570 can be provided as one or more cooperating metal layers $\mathbf{570}_1$, $\mathbf{570}_2$.

The dielectric substrate 560 of FSS 550F can have a dielectric constant in a range of about 2-4, such as about 3.7 and a thickness of about 5 mil with metallization patterns formed therein or thereon. The thickness can vary but thinner materials can provide lower loss.

Referring to FIGS. 13, 14, 15A and 15B, the pattern 1500*p* of the patches 1502 can be provided by at least one metal layer 570 and can be provided throughout the full area of the FSS 550F or only on sub-segments or sub-regions of the non-metallic (e.g., dielectric) substrate 560 to allow some defined frequencies to pass through the reflector 550 from antenna elements residing behind the reflector 550 and to reflect some other frequencies associated with antenna elements 130 residing in front of the FSS 550F. The pattern 1500*p* may have different sized and/or shaped patches 1502 in different areas of the at least one metallic layer 570. For example, in some areas there may be no pattern, a partial pattern or a full metal segment 570*m*.

FIG. 13 illustrates that a full metal segment 570*m* can reside below the FSS 550F and can be behind a passive antenna assembly 120'. The full metal segment 570*m* may be provided by a metal sheet or metallized layer and act as a reflector for the passive antenna assembly 120'. The FSS 550F can be positioned above the full metal segment 570*m*. In some embodiments, the full metal segment 570*m* may have a length that is greater than the reflector 550 formed of the FSS 550F.

Referring to FIGS. 13, 17A-17F, the FSS 550F may, for example, reside behind two linear arrays (columns) 131-1, 131-2 of antenna elements 130. The antenna elements 130 can be low band antenna elements. The FSS 550F can reside in front of other antenna elements 1140 (FIG. 16B) such as antenna elements of a massive MIMO or beamforming array or other higher band antenna elements. Some higher band antenna elements 1140 can reside behind the FSS 550F and in front of another internal reflector 1172 (FIG. 16B), such as a reflector of an active antenna module that can releasably engage the base station antenna 100. Other antenna elements 140 discussed above may also reside in front of the FSS 550F. Some antenna elements 140' (FIG. 13) can be provided as a mid-band array, for example, and can also reside in front of the full metal segment 570*m*.

The pattern 1500*p* can be provided by one metal layer 570 or by different metal layers $\mathbf{570}_1$, $\mathbf{570}_2$ (FIGS. 15C-15D) that cooperate to provide the frequency selective characteristics that can substantially prevent the electromagnetic waves within a first operational frequency band from passing through the reflector 550 while allowing the electromagnetic waves within a second operational frequency band to pass through the reflector 550.

The patches 1502 can be formed by etching a copper layer that is formed on the non-metallic substrate 560.

Referring to FIGS. 14, 15A, 15B, and 15C, the pattern 1500*p* of patches 1502 can be provided as an array of closely spaced apart geometric shaped metal patches 1502. The pattern 1500*p* of metal patches 1502 can be provided in a number of suitable geometric shapes, such as, for example, hexagonal, circular, rectangular or square shape patches of metal with gaps 1503 between each of the neighboring patches 1502. A metallic grid 1530 (FIG. 14, 15A, 15B) may be provided about the pattern 1500*p* of metal patches 1502. The term "grid" means an open cell or lattice type structure.

In some embodiments, the FSS 550F of the reflector 550 can be configured to act like a High Pass Filter essentially allowing low band energy (i.e., RF signals in the low-band frequency range) to completely reflect (the FSS 550F can act like a sheet of metal) while allowing higher band energy (i.e., RF signals in the high-band frequency range of, for example, about 3.5 GHz or greater), to substantially pass through the FSS 550F. Thus, the FSS 550F is transparent or invisible to the higher band energy and a suitable out of band rejection response from the FSS can be achieved. The FSS 550F may allow a reduction in filters or even eliminate filter requirements for looking back into a radio of an active antenna module.

The pattern 1500*p* can be configured so that there is a perimeter gap space 1503 separating neighboring patches $\mathbf{1502}_1$, $\mathbf{1502}_2$, (FIG. 15B) for example. The gap spaces 1503 may comprise regions of the dielectric substrate 560 on which no metal is deposited. The grid 1530 can have grid elements 1530*e* that surround each metal patch 1502. The grid 1530 can be provided as a metallic grid that is positioned inside the gap spaces 1503 between patches 1502. As shown best in FIGS. 15A and 15B, the grid 1530 may subdivide the gap space 1503 into "islands" of dielectric material that surround each metal patch 1502. The grid 1530 can be provided as a thin grid. The term "thin grid" means that the grid has a thickness (e.g., width in a lateral dimension and/or a depth in a front to back direction of the housing of the base station antenna 100) that is in a range of about 0.01 mm and 0.5 mm, such as, for example about 0.1 mm.

As shown, the large patches are metal, e.g., copper, and the adjacent region is the gap 1503 which can be defined by an exposed substrate. The grid element 1530*e* is spaced apart from neighboring patches 1502 by a grid element 1530*e*. The patches 1502 are metal and the thin grid 1530 is also metal, typically the same metal but different metals can be used. The area between the patches 1502 and the grid elements 1530*e* is the gap 1503 and the area of the gap 1503 between adjacent patches 1502 can have a lateral extent that is less than the area of the patch 1502 and greater than the grid element 1530*e*.

In some embodiments, the reflector 550 may be implemented by forming the one or more metal layer(s) 570 on a printed circuit board, optionally a flex circuit board. In some embodiments, the reflector 550, for example, may be implemented as a multi-layer printed circuit board 1500*c* (FIG.

15D), one or more metal layers 570 of which are formed with at least the pattern 1500*p* of metal patches 1502 to provide the FSS 550F. The FSS 550F can be configured such that electromagnetic waves within a predetermined frequency range cannot propagate through the reflector 550 and one or more other predetermined frequency range associated with the one or more metal layers 570 of the multi-layer printed circuit board 1500*c* is/are allowed to pass therethrough.

Referring to FIG. 15C, the FSS 550F, can comprise a nonmetallic substrate 560 having a plurality of cooperating metal layers, shown as metal layers $\mathbf{570}_1$, $\mathbf{570}_2$, to provide the at least one metal layer 570 with partial or full patterns 1500*p* of patches 1502. The nonmetallic substrate 560 can be a dielectric material. The at least one metal layer 570 may comprise the metal pattern 1500*p* of patches 1502 and the metallic grid 1530. The pattern 1500*p* can be configured to allow some frequencies to go through the reflector 550 and some frequencies to be reflected. The pattern 1500*p* can be the same or different in size and/or shapes of patches 1502 over respective areas or sub-areas and/or on different layers.

Still referring to FIG. 15C, the shapes of patches 1502 and the shape of the elements 1530*e* of the metallic grid 1530 that surround respective patches 1502 can be the same, e.g., polygonal, hexagonal, circular, rectangular or square patches 1502 that may be formed of metal, with respective metal grid elements 1530*e* surrounding corresponding patches 1502.

The FSS 550F can comprise two metal structures which are printed on the same side or on opposing sides (primary surfaces) 1510, 1512 of the nonmetallic substrate 560. One structure can be a pattern 1500*p* of patches 1502 of polygons, such as squares or hexagons, and the other structure can be a metal mesh or grid 1530 that looks like a honeycomb structure.

Referring to FIGS. 15C, 15D, the metallic grid 1530 can be etched, printed or otherwise provided on a first primary surface 1510 of the nonmetallic substrate 560, on an opposite side 1512 of the nonmetallic substrate 560 as the patches 1502 and is not required to be on the same side/primary surface of the nonmetallic substrate 560 that the at least one metal layer 570 that provides the patches 1502 is on.

Where used, the metal grid 1530 can optionally be positioned in front of, behind or between one or more adjacent layers providing the pattern 1500*p* of patches 1502. Where a metal grid 1530 is used, it can be placed or formed on a top or bottom layer of the nonmetallic substrate 560 and/or behind a rearwardmost patch 1502 (closest to the rear of the housing of the base station antenna) or in front of a forwardmost patch 1502 (closest to the front of the base station antenna).

Referring to FIG. 15D, the reflector 550 can comprise a printed circuit board 1500*c*. In some embodiments predetermined frequency ranges associated with the one or more layers of the multi-layer printed circuit board may not overlap with one another. In some embodiments, the predetermined frequency ranges associated with the one or more layers of the multi-layer printed circuit board may at least partially overlap with one another. In such embodiments, each layer in the multi-layer printed circuit board that is formed with a frequency selective surface is equivalent to a "spatial filter", and the entire multi-layer printed circuit board equivalently comprises a plurality of cascaded "spatial filters", wherein each "spatial filter" is configured to either allow or stop (i.e., passes or substantially attenuates and/or reflects) a part of the first operational frequency band, thereby collectively substantially allowing or preventing the electromagnetic waves within a respective defined operational frequency band to either passing through or be blocked/reflected by the reflector. As such, the design for the frequency selective surface of each layer of the multi-layer printed circuit board 1500*c* may be simplified while ensuring that the electromagnetic waves within the defined one or more operational frequency bands are reflected/substantially blocked by the reflector 550 or allowed to pass through the reflector 550.

Referring to FIGS. 15C and 15D, in some embodiments, the reflector 550 may comprise a dielectric board as the nonmetallic substrate 560 having opposed first and second primary surfaces 1510, 1512 that both reside behind the radiators of respective columns of first radiating elements 131-1, 131-2 (FIG. 13) where one or both primary surface 1510, 1512 can comprise a periodic conductive structure that forms the frequency selective surface. The periodic conductive structures $\mathbf{1500}p_1$, $\mathbf{1500}p_2$ can be on opposing corresponding first and second primary surfaces 1510, 1512 to form the FSS 550F.

In some embodiments, the FSS 550F may comprise a plurality of reflector units that are arranged periodically, where each unit may comprise a first unit structure forming the periodic conductive structure on the first primary surface of the dielectric board and a second unit structure forming the periodic conductive structure on the second primary surface of the dielectric board. A position of the first unit structure may correspond to a position of the second unit structure. In some embodiments, as viewed from a direction perpendicular to the first and second primary surfaces, the center of each first unit structure coincides with the center of corresponding second unit structure.

In some embodiments, the first unit structure may be equivalent to an inductor (L), the second unit structure may be equivalent to a capacitor (C), thereby the reflector unit comprising the first unit structure and the second unit structure that are correspondingly disposed may be equivalent to an LC resonant circuit. In some embodiments, the reflector unit may be configured to be equivalent to a parallel LC resonant circuit. A frequency range that the frequency selective surface allows to pass therethrough may be adjusted to a desired frequency range by designing the equivalent inductance of the first unit structure and the equivalent capacitance of the second unit structure.

In some embodiments, the traveling radio frequency wave that goes through FSS 550F can see a shunt LC resonator and a transmission line. The substrate has an impedance $Z_0$ depending on its thickness. The capacitance of each unit cell can be made of the coupling across the gap 1503 between the grid 1530 and the patch 1502. The inductor can be defined by/made out of metallic thin lines of the grid 1530.

The mesh/grid can define a high pass filter and the patches can define a low pass filter, together defining a band pass filter. A multiple layer printed circuit board can be used for a sharper filter response.

In some embodiments, the periodic conductive structure on the first primary surface of the dielectric board comprises a grid (array structure) 1530, the first unit structure comprises a grid element 1530*e* serving as a repetition unit in the grid array structure 1530, and the periodic conductive structure on the second primary surface of the dielectric board comprises a patch array pattern and/or structure 1500*p*, the second unit structure comprises a patch 1502 serving as a repetition unit in the patch array structure 1500*p*. For example, the grid element 1530*e* of the first unit structure may have an annular shape of a regular polygon such as a square, the patch 1502 of the second unit structure may have a shape of a regular polygon such as a square.

For example, as shown in FIG. 15C, the reflector 550 can comprise a set of reflector units 1500*u*. A respective reflector unit 1500*u* can be configured to have a periodic (conductive) and/or unit structure on a first primary surface 1510 and a periodic (conductive) and/or unit structure on the second primary surface 1512. The unit structure on the first primary surface 1510 can be a grid element 1530*e* of a metal grid 1530 and the unit structure on the second primary surface 1512 can be a metal patch 1502. The shapes and sizes of aligned pairs of the unit structures of a respective reflector unit 1500*u* can be the same or different, shown as the same size and shape. For example, the reflector unit 1500*u* can have a square grid providing square grid elements 1530*e* and a square patch 1502 (second unit structure) at corresponding positions on both sides/primary surfaces 1510, 1512 of a dielectric board. As viewed from a direction perpendicular to the first and second primary surfaces 1510, 1512, the center of the square grid 1530 coincides with the center of the square patch 1502. Such a reflector unit 1500*u* may be configured to be equivalent to a parallel resonant circuit formed by an inductor (the square grid) and a capacitor (the square patch). The magnitudes of the inductance of the inductor and the capacitance of the capacitor of the equivalent parallel resonant circuit may be determined based on desired frequency selectivity of the frequency selective surface, and then the sizes of the grid elements 1530*e* and the patches 1502 can be determined accordingly. In the example of FIG. 15C, the reflector material 1500 is shown to include reflector units 1500*u* in three rows and eight columns, however, it will be appreciated that this is a non-limiting example, the arrangement of the reflector units may be determined based on designed sizes of the unit structures.

In the example patterns shown in FIG. 15C, conductive materials are present at positions of black lines (the metal grid 1530) and black patches 1502 (blocks) and are not present at white positions. Conductive materials may be deposited at both sides of a dielectric board and then respective patterns may be formed by etching technologies such as photolithography or FIB milling, thereby forming periodic conductive structures to realize the frequency selective surface. Any other suitable methods currently know or developed later in the art may be employed to form desired periodic conductive structures on the dielectric board. The periodic conductive structures may be formed using any suitable conductive materials, typically using metal such as copper, silver, aluminum, and the like. The nonmetallic substrate 560 can comprise a dielectric board and may employ, for example, a printed circuit board. The thickness, dielectric constant, magnetic permeability and other parameters of the dielectric board may affect the reflective or transmissive properties at desired operating frequencies.

FIG. 16A shows an example low band antenna element 130 with dipole arms residing in front of the FSS 550F provided by the nonmetallic substrate 560 and the at least one metal layer 570. FIG. 16B shows an example high band antenna element 1140 residing behind the reflector 550 with the FSS 550F and in front of another reflector 1172. The reflector 550 can reside closer to the front 100F of the base station antenna than the reflector 1172. The antenna element 1140 can be a higher band/high band active antenna 1140 (e.g., HB/3.5 GHz) forward of the reflector 1172 and can transmit RF energy through the FSS 550F.

The reflector 550 can reside a distance in a range of ⅛ wavelength to ¼ wavelength of an operating wavelength behind the low band dipole antenna element(s) 130, in some embodiments. The term "operating wavelength" refers to the wavelength corresponding to the center frequency of the operating frequency band of the radiating element, e.g., low band radiating element 130. The feed stalks 130*f* (FIG. 17C) of the antenna elements 130 can be configured to extend outward from the reflector 550. FIGS. 17E and 17F illustrate that the reflector 550 can be configured with cutouts or channels 2170 that allow the reflector 550 to be slid into place or otherwise assembled to the base station antenna 100. It will be appreciated that FIG. 17F is an exploded view in which the reflector 550 is pictured as being behind the radiating elements 130. It will be appreciated that the reflector 550 can be provided in this position or can be positioned more farther forwardly than shown in FIG. 17F so that the reflector is behind the dipole arms of the antenna elements 130 but forward of the rear portions of the feed stalks of the antenna elements 130.

Figure 17A:
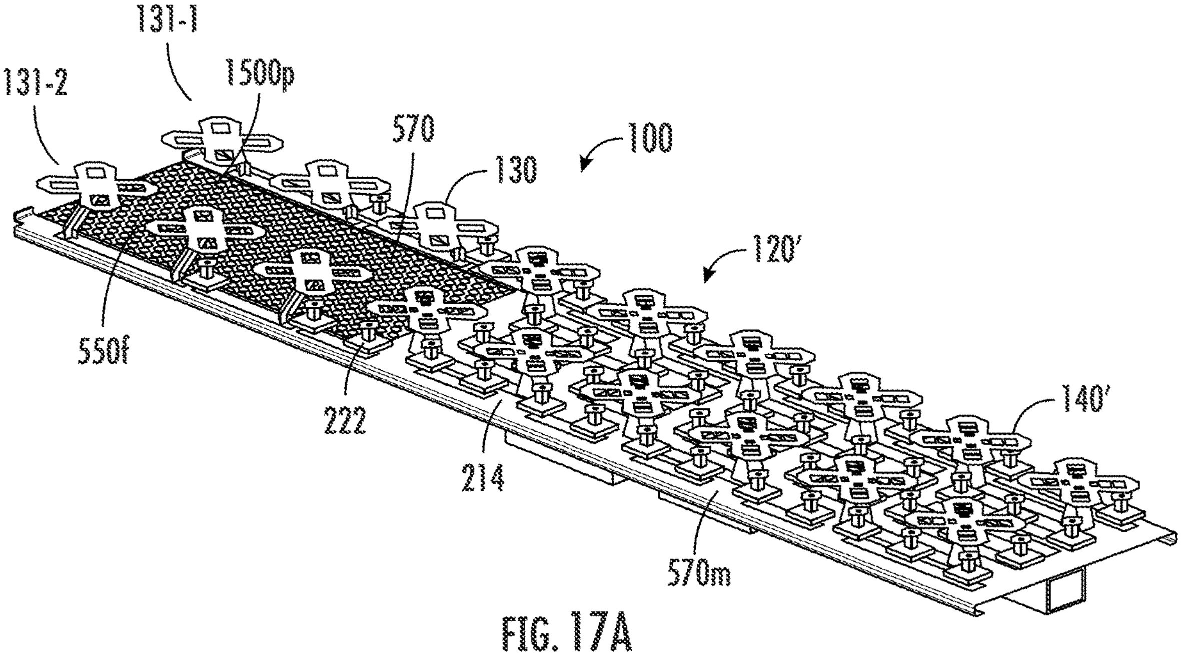
FIG. 17A is a side perspective view of the reflector assembly shown in FIG. 13.
Figure 17B:
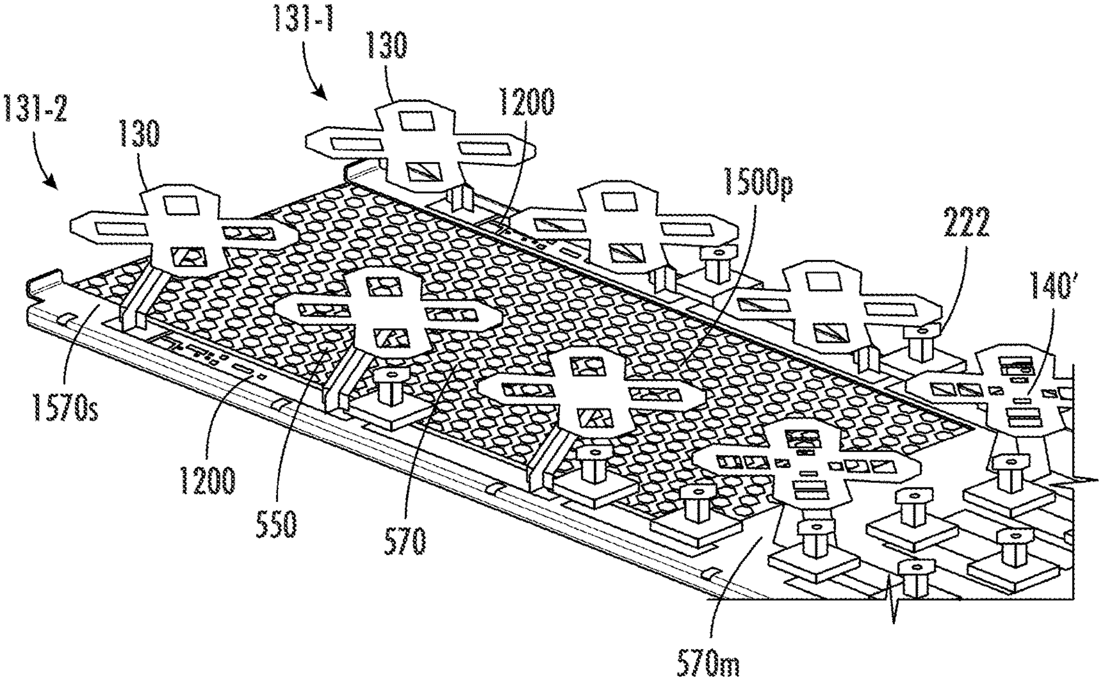
FIG. 17B is an enlarged side perspective view of a top portion of the reflector assembly shown in FIG. 17A.
Figure 17C:
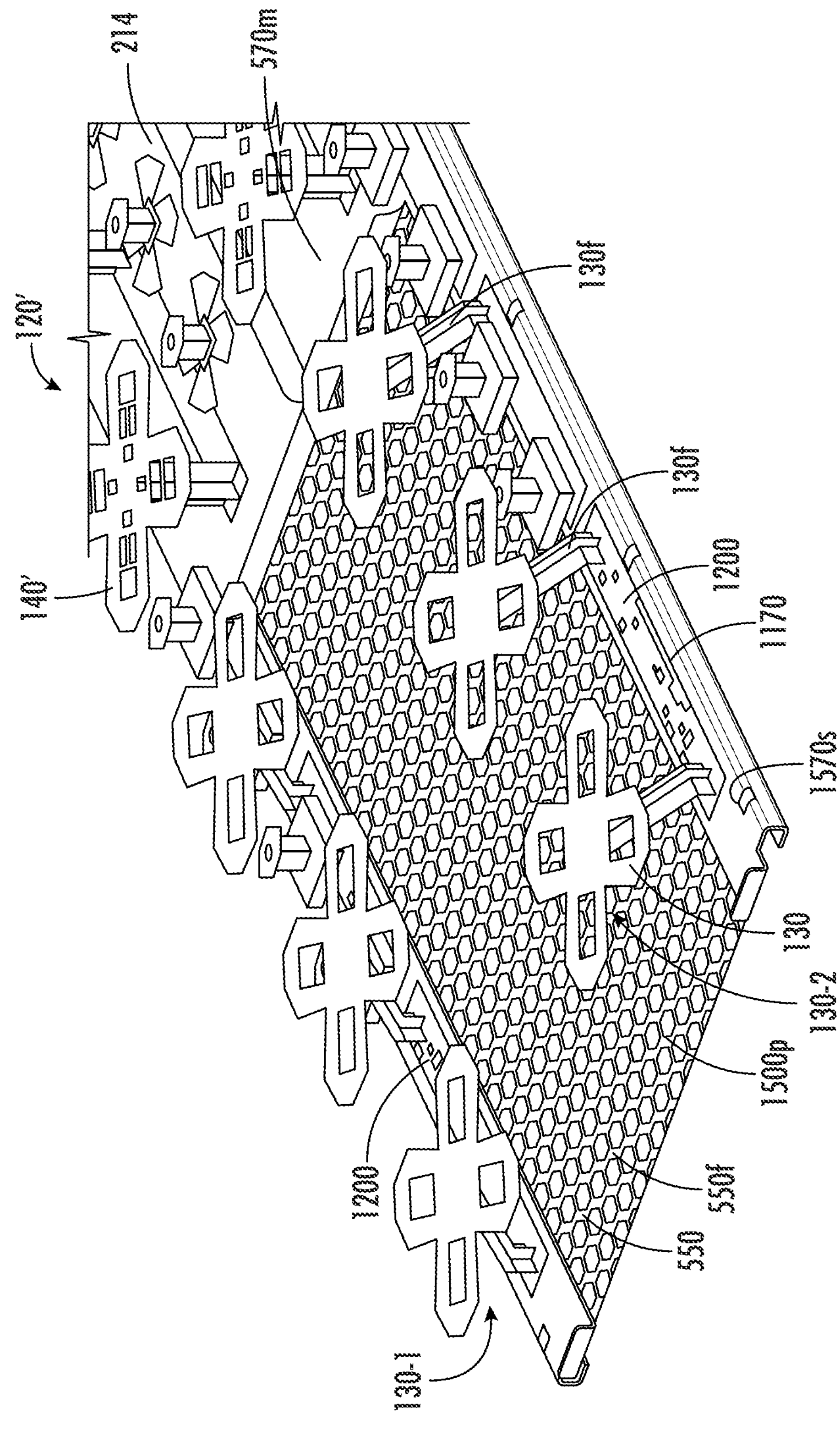
FIG. 17C is a top perspective partial view of the reflector assembly shown in FIG. 17A.
Figure 17E:
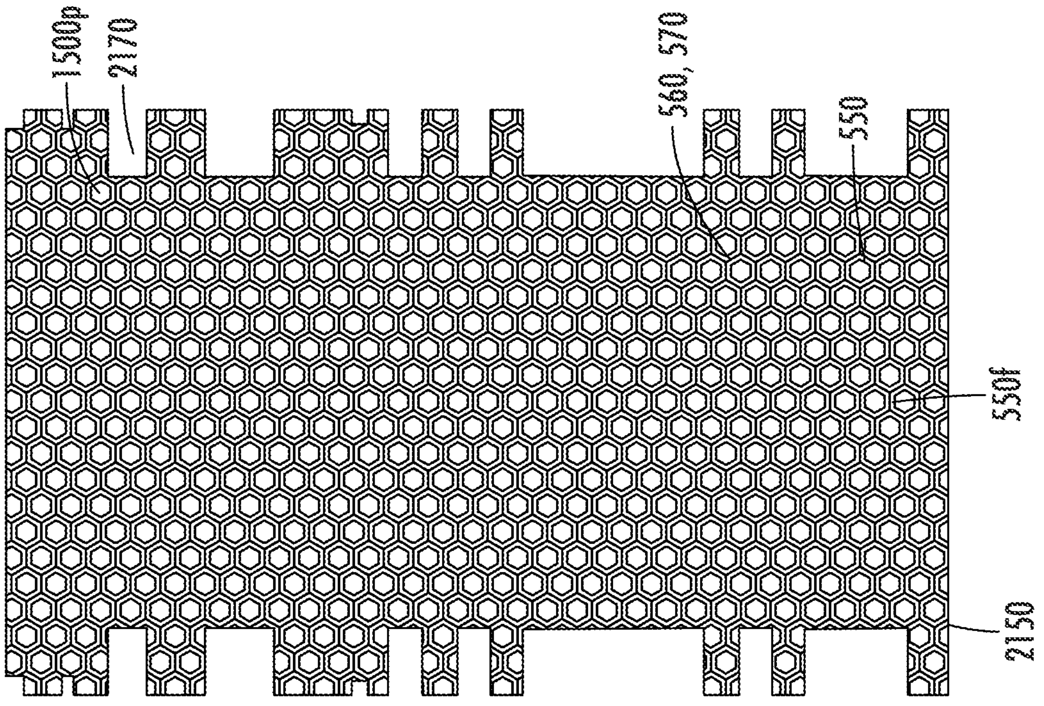
FIG. 17E is a front view of an example reflector of the reflector assembly shown in FIG. 17A.
Figure 17D:
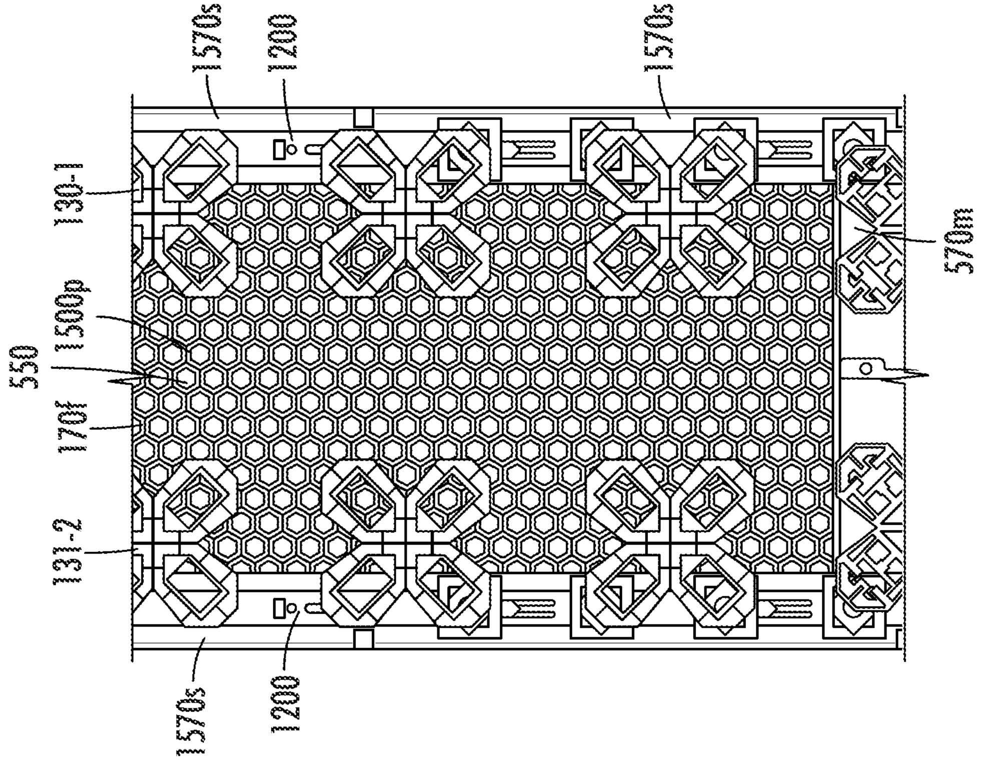
FIG. 17D is a front view of the top portion of the reflector assembly shown in FIG. 17C.
Figure 17F:
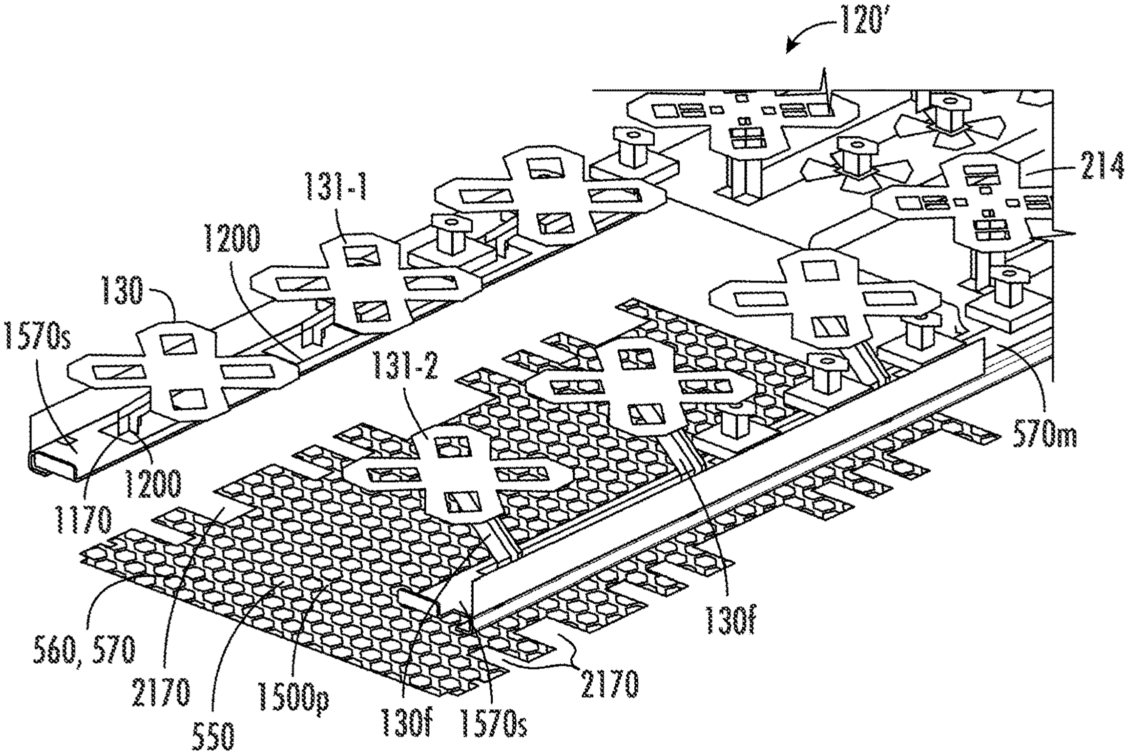
FIG. 17F is a top, side perspective partial exploded view of the reflector assembly shown in FIG. 17A.
Figure 17G:
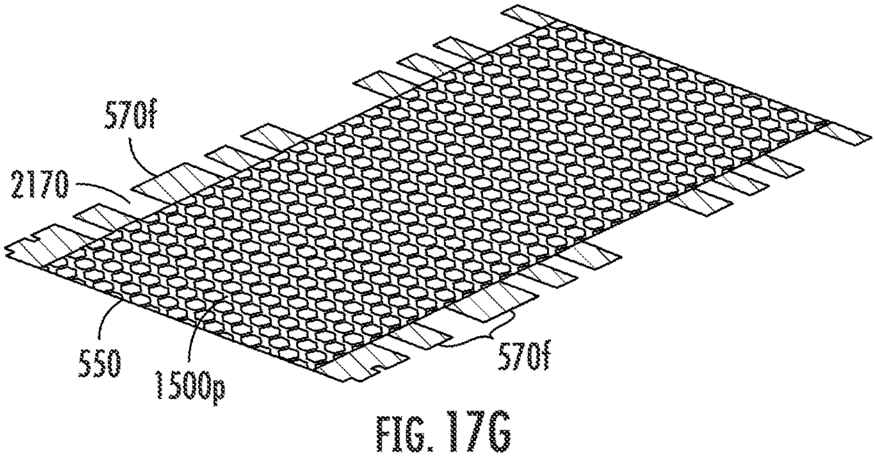
FIG. 17G is a partial side perspective view of another embodiment of a reflector for the reflector assembly shown in FIG. 17A or 13.

Referring to FIG. 17A, the reflector 550 can be coplanar with a main reflector 214 provided as a full metal layer and/or metal sheet 570*m*.

Referring to FIGS. 17A-17G, a portion of a base station antenna 100 is shown with an antenna assembly 120' comprising a primary reflector 214 and the reflector 550. The antenna assembly 120' can be provided as a passive antenna assembly. The primary reflector 214 of the antenna assembly 120' can be configured to have upper extensions forming metal reflector side segments 1570*s* that can be coupled to the reflector 550 comprising the at least one metal layer 570. Feed boards 1200 can be provided that extend a distance in front of the side segments 1570*s* and that can connect to feed stalks 130*f* of radiating elements 130 (such as low band elements). The feed stalks 130*f* can be angled feed stalks that project outwardly and laterally inward to position the front end of the feed stalks 130*f* closer to a lateral center of the reflector 550 than a rearward end. The feed boards 1200 can be connected to the reflector 550 and/or metal side segments 1570*s*. The feed boards 1200 can be parallel to the reflector 550 and positioned laterally on each side thereof as shown.

In some embodiments, the reflector 550 can be configured with a metal pattern 1500*p* that merges into side segments or areas of full metal 570*f* which may be shaped as laterally extending metal tabs with front and/or back surfaces fully metallized. The areas of full metal 570*f* can couple, for example, capacitively couple, to the side segments 1570*s* of the passive (primary) reflector 214 residing on right and left sides of the base station antenna.

Figure 17H:
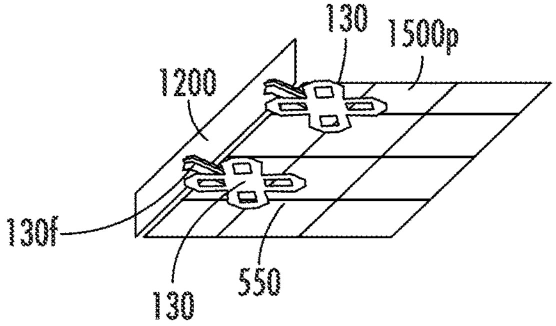
FIG. 17H is a partial side perspective view of a feed board(s) and reflector configuration for the reflector assembly shown in FIG. 17A or 13.

In some embodiments, as shown in FIG. 17H, the feed boards 1200 can be orthogonal or substantially orthogonal (+/−15 degrees) to the reflector 550. In this orientation, the feed boards 1200 can be positioned adjacent and parallel to or substantially parallel to (+/−30 degrees) the side walls of the base station antenna joining the front radome and the back of the base station antenna. Antenna elements 130 can extend inward over the reflector 550. This configuration may reduce blockage of high band energy at high scan angles. A laterally wide, e.g., whole width, FSS reflector 550 may be used so that the reflector 550 extends laterally outward a distance corresponding to a lateral width of the base station antenna.

It is also noted that feed boards 1200 are not required and small or miniature power dividers with cables can be used in lieu of feed boards.

The feed boards 1200 can be positioned to be behind the reflector 550. The feed boards 1200 can be positioned to be in front of the reflector 550. The feed boards 1200 can be electrically coupled to the reflector 550 and/or primary reflector 214. The reflector 550 can be in front of or behind the primary reflector 214 and optionally can be capacitively coupled to the primary reflector 214.

FIGS. 17E and 17F illustrate that the reflector 550 can have an outer perimeter 2150 with longitudinally extending sides having laterally and longitudinally extending channels (or cut outs) 2170, some channels or cut outs 2170 having a greater length dimension than others. The channels or cut outs 2170 can be configured to allow connectors and/or cables, typically from feed boards 1200, to extend therethrough. In some embodiments, when in front of the feed boards 1200, for example, the channels or cut outs 2170 can be configured to allow the feed stalks 130*f* of antenna elements 130 to extend from the feed boards 1200 out toward the front of the base station antenna 100 through the channels 2170.

As discussed above, the base station antenna 100 can include one or more arrays 131-1, 131-2 of low-band radiating elements 130, one or more arrays of mid-band radiating elements 222 (FIG. 13, 17B), and one or more arrays of high-band radiating elements 140, 140', 1140. The radiating elements may each be dual-polarized radiating elements. Further details of radiating elements can be found in co-pending WO2019/236203 and WO2020/072880, the contents of which are hereby incorporated by reference as if recited in full herein.

The low-band radiating elements 130 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The low-band linear arrays 131-1, 131-2 may or may not be configured to transmit and receive signals in the same portion of the first frequency band. For example, in one embodiment, the low-band radiating elements 130 in a first linear array may be configured to transmit and receive signals in the 700 MHz frequency band and the low-band radiating elements in a second linear array may be configured to transmit and receive signals in the 800 MHz frequency band. In other embodiments, the low-band radiating elements 130 in both the first and second linear arrays may be configured to transmit and receive signals in the 700 MHz (or 800 MHz) frequency band.

The other antenna elements 1140 can be high-band radiating elements that can be mounted in columns, typically in the upper medial or center portion of antenna 100, to form a massive MIMO array of high-band radiating elements. The high-band radiating elements may be configured to transmit and receive signals in a third frequency band. In some embodiments, the third frequency band may comprise the 3300-4200 MHz frequency range or a portion thereof.

It will be appreciated that there is increasing demand for weight and cost reduction in base station antennas. Typically, around 80 percent or more of the weight of the base station antennas are from the reflector and the radome. Referring to FIGS. 18, 19A, 19B and 20, embodiments of the present invention provide a reflector assembly 651 with a reflector 650 having a non-metallic substrate 660 and a metal layer 670 configured to provide a relatively low-weight reflector assembly 651 without compromising the electrical performance of the reflector 650. The reflector assembly 651 differs from the reflector assembly 151 or reflector assembly 550 in that the substrate 660 is further provided with integral geometric stiffening structures or features 666, with a respective stiffening feature 666 configured to surround at least some radiating elements 1600. The radiating elements 1600 can be low band, mid-band or high band radiating elements.

The thickness of the metal layer 670 on the non-metallic substrate 660 can be in a range of about 0.004 mm to about 0.5 mm, such as, for example, about 25 micrometers or such as, for example, about 0.1 mm. The metal layer 670 on the reflector 650 is provided to have a surface having metal (conductive) properties for reflecting signals from the radiating elements 1600 and for providing a ground plane for the radiating elements 1600.

The stiffening features 666 may take the form of integral (upstanding in the orientation shown) ribs 666*r*, for example. The stiffening features 666 can be provided as a crisscross pattern of a series of intersecting rows 666*t* and columns 666*c* as shown. In some embodiments, the stiffening features 666 protrude from the front side of the substrate 660. In some embodiments, the substrate 660, including the stiffening features 666, is monolithic.

Figure 20:
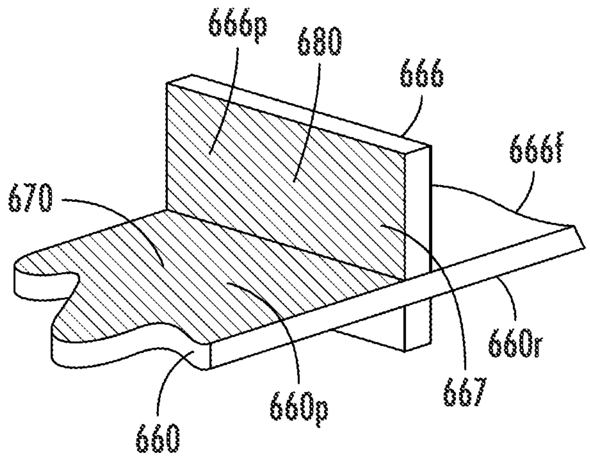
FIG. 20 is a greatly enlarged view of a portion of a stiffening feature shown in FIG. 18 according to embodiments of the present invention.

In some embodiments, as shown in FIG. 20, the stiffening features 666 can protrude from both the front side 660*f* and the rear side 660*r* of the substrate 660. A stiffening feature 666 can project forward a distance that is greater than the corresponding stiffening feature 666 projects rearward.

Figure 18:
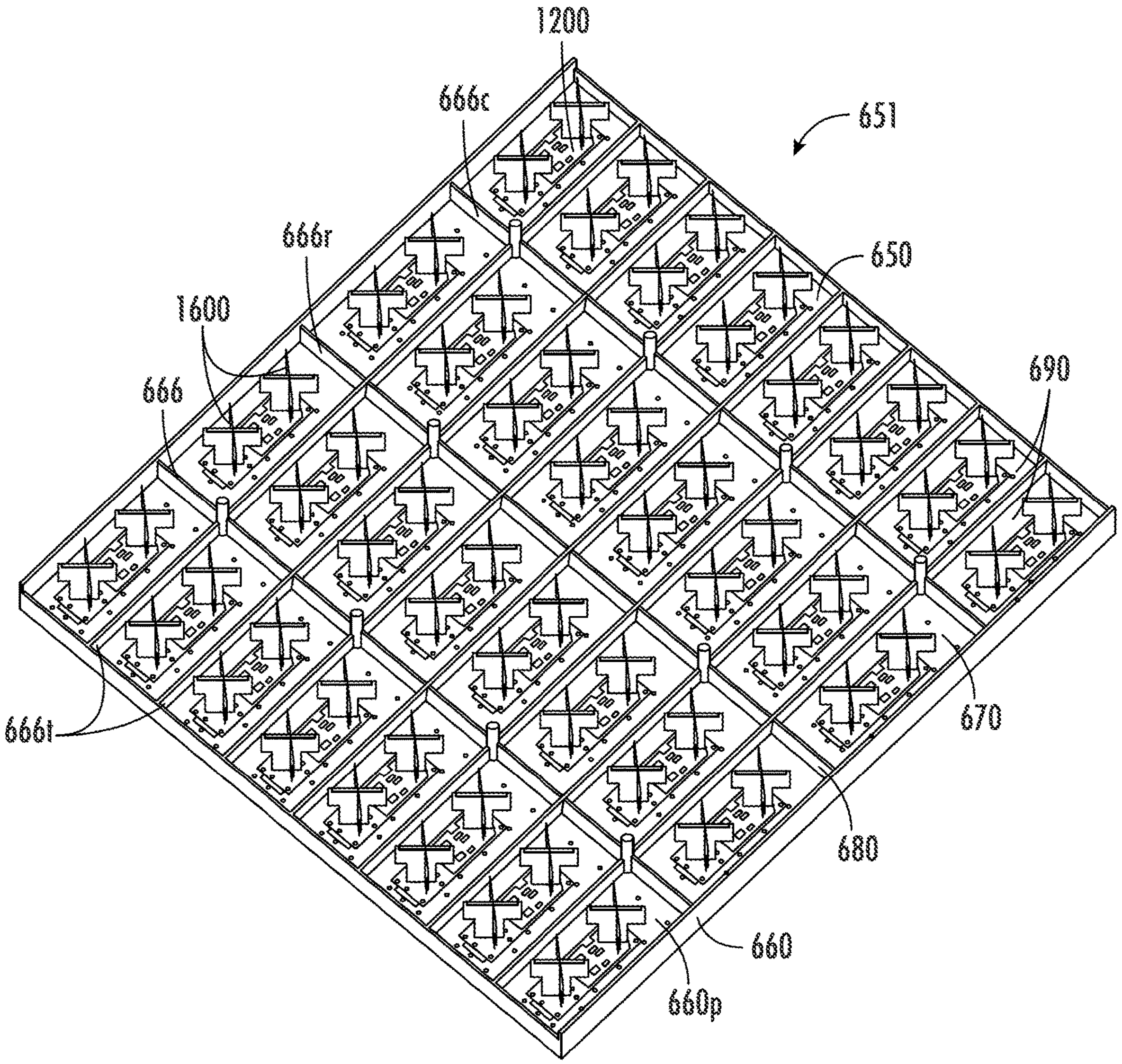
FIG. 18 is a front side perspective view of another embodiment of a reflector assembly according to embodiments of the present invention.
Figure 19A:
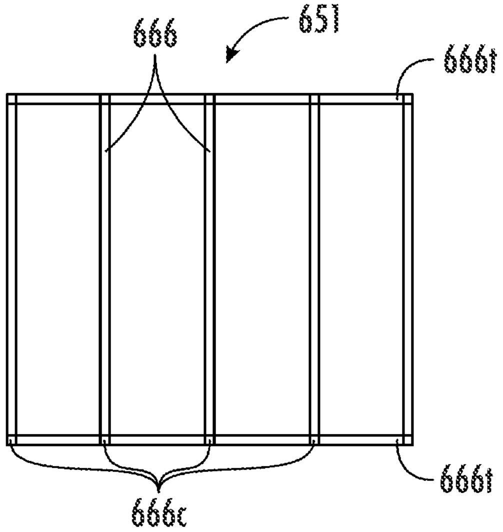
FIGS. 19A and 19B are front schematic views of example reflectors, similar to the reflector of the reflector assembly shown in FIG. 18 but with different stiffening feature configurations according to embodiments of the present invention.
Figure 19B:
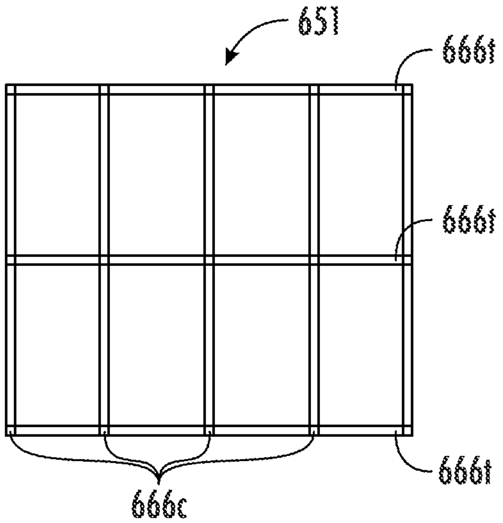

The stiffening features 666 can be provided as forwardly projecting ribs 666*r* that extend in a crisscross pattern for increasing strength of the non-metallic substrate 660 and hence for the reflector 650. The rearward facing surface of the non-metallic substrate 660 can be planar and devoid of stiffening features. FIG. 18 shows the stiffening features 666 provided as a series of longitudinally spaced apart and transversely extending rows 666*t* that intersect a series of longitudinally extending columns 666*c* that are transversely or laterally spaced apart. FIG. 19A shows the stiffening features 666 provided as a series of longitudinally spaced apart columns 666*c* and a first row 666*t* at a top portion and a second row 666*t* at a bottom portion of the reflector assembly 651 without requiring successive rows 666*t* of stiffening features 666. FIG. 19B shows the stiffening features 666 provided as a series of longitudinally spaced apart columns 666*c* and a first row 666*t* at a top portion and a second row 666*t* at a bottom portion of the reflector assembly 651 and a third row 666*t* between the top and bottom portions, which can be medially positioned in the longitudinal direction. Other patterns and/or numbers and configurations of rows and columns of stiffening features 666 may be used. The crisscross pattern can define rectangular planar regions 690 for mounting radiating elements 1600 in the rectangular planar regions. As shown, a plurality of (e.g., two) radiating elements 1600 can reside within each rectangular planar region 690.

Referring to FIGS. 18 and 20, for example, the stiffening features 666 can also comprise at least one metal layer 680 on at least one primary surface 666*p* of a respective stiffening feature 666. Thus, the stiffening feature with the at least one metal layer 660 can define a longitudinally extending isolation wall or fence 667 for radiating elements 1600 whereby radiation from adjacent columns of radiating elements 1600 on either side of a respective wall or fence 667 may be deflected. The metal layer 680 may only be provided on one or both of the primary surfaces 666*p* of longitudinally extending columns 660*c* of stiffening features 666. The primary surfaces 666*p* of the stiffening features 666 can be orthogonal to the primary surface 660*p* of the non-metal substrate 660 and/or reflector 650. The metal layer 680 on a respective stiffening feature 666, such as a rib 666*r*, where used, can be provided only on the longitudinally extending stiffening features 666*c* and is not required on the laterally extending rows 666*t* but may be provided thereon.

In the non-metallic substrate 660, the stiffening structures or features 666, as well as mounting holes 658 may be manufactured directly in the substrate 660. In some embodiments, the substrate 660, including the stiffening features 666 and walls defining the mounting holes 658, is monolithic. The mounting holes 658 can be provided in the stiffening features 666. Thus, undesired deformation of the reflector generated by a stamping process for a conventional metal reflector may be avoided. The mounting holes 658 can be arranged along some or all columns 666*c* and some or all rows 666*t*.

The metal layer 670 can be provided by metallization of the non-metallic substrate 660 as discussed above. The metallization can be provided as contiguous surface layer or provided in the periodic conductive patches discussed above with respect to FIGS. 13-17 for the FSS of the reflector.

The reflector 650 may be produced by electroplating, spray coating, IMD (In-Mold-Decoration) and the like. The non-metallic substrate 660 may be produced by injection molding and materials for the substrate 660 may be polymers, copolymers or other engineering plastic materials having good strength, such as polycarbonate (PC), a thermoplastic polymer such as acrylonitrile butadiene styrene (ABS) and the like. Alternatively, the substrate 660 may be produced by a SMC (sheet molding compound).

Figure 21A:
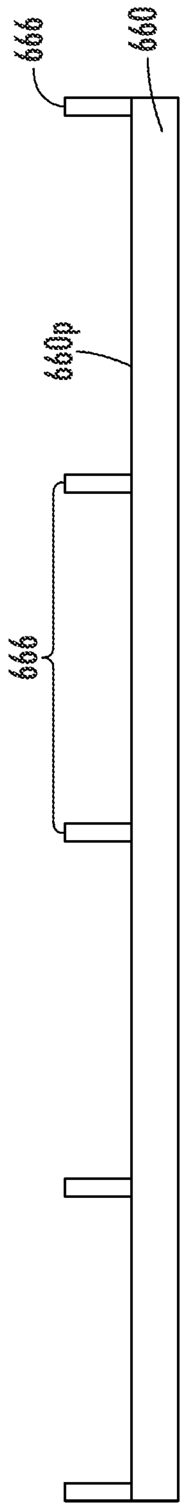
FIGS. 21A-21C are enlarged schematic views of a sequence of example actions for forming a metal layer on a non-metallic substrate according to embodiments of the present invention.
Figure 21B:
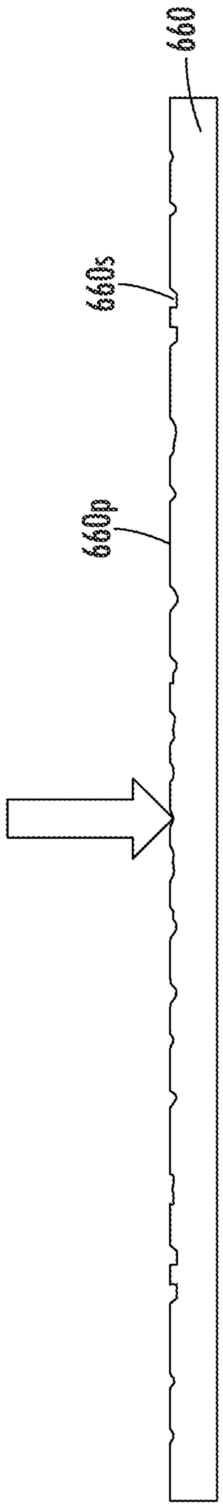
Figure 21C:
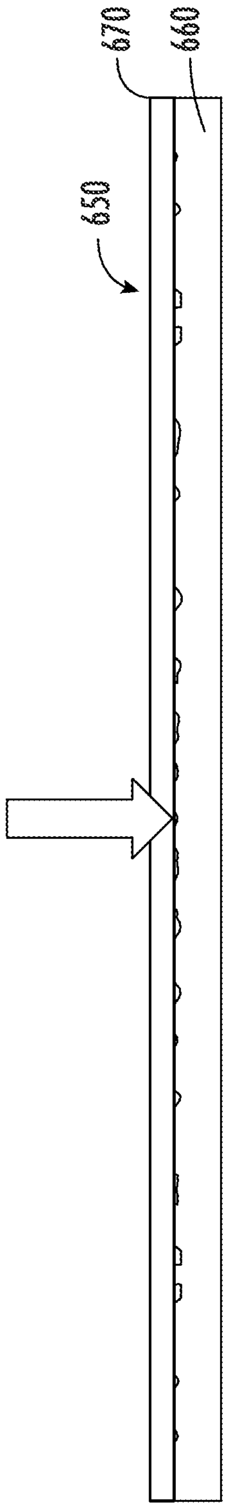

Referring to FIGS. 21A-21C, an example electroplating sequence for metallizing the substrate 660 is shown. The electroplating process can integrally apply a metallization on the non-metallic substrate 660 so that the reflector 650 has a conductive and electrical signal reflecting function/configuration to combine the advantages of the substrate 660 and the metal layer 670. The electroplating process may include providing a clean primary surface 660*p* or cleaning a primary surface 660*p* of the substrate 660 (which can include integral stiffening features 666), treating the primary surface 660*p* with a solvent to roughen the surface 660*s* (FIG. 21B, shown without stiffening features 666), and coating the primary surface 660*p* by electroplating (FIG. 21C, shown without stiffening features) to define the reflector 650 with the metal layer 670 on the substrate 660.

The (electrospray) coating process for the metallization can be carried out by directing gas, such as an airflow, through a nozzle of a spray coating device. A flowable lacquer can be entrained in the gas/airflow by a vacuum generated by the gas/airflow and then is sprayed out as a lacquer mist which can be deposited on the non-metallic substrate 660 as a uniform smooth lacquer (metal) film.

In some embodiments, the spray coating process may include following steps: (a) tempering the non-metallic substrate 660 whereby the substrate 660 is heated to a temperature lower than a heat deformation temperature and kept under this temperature for a defined time period, typically between 10 minutes to 10 hours, more typically at least one hour and up to several hours; (b) cleaning the surface to remove surface oil by use of a cleaning agent, then rinsing/cleaning the primary surface 660*p* by use of pure or sterile or substantially sterile liquid such as water, and then drying the cleaned substrate 660 by passive or active drying such as by air dry or by heated dryer; (c) removing static electricity and dust particles using high-pressure ionized air; and (d) spray coating to form a film onto the substrate 660, which can be in a range of 1-30 μm, typically about 20 μm, and then drying the coating on the substrate passively or actively by air dry or by heat. The spray coating process may be repeated several times, and air or forced heat can be used to dry each successive spray coating action. The reflector 650 can then be placed in an oven after the spray coating process when a desired thickness of metal has been applied. The thickness can be in a range or about 0.004 mm to about 0.5 mm.

In some embodiments, in-mold decorating (IMD) for transferring metal graphics to injection molding (IMD technology) can be used for providing the metallization of the metal layer 670 onto the substrate 660. For example, the non-metallic substrate 660 may be produced by a SMC process and a metal (conductive) layer 670 may be laminated or injection molded or otherwise integrated into or onto an outer primary surface 660*p* of the non-metal substrate 660. The metal layer 670 may be a conductive layer such as a conductive film, a conductive fabric or the like or combinations of conductive film and fabric.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout In the discussion above, reference is made to the linear arrays of radiating elements that are commonly included in base station antennas. It will be appreciated that herein the term "linear array" is used broadly to encompass both arrays of radiating elements that include a single column of radiating elements that are configured to transmit the sub-components of an RF signal as well as to two-dimensional arrays of radiating elements (i.e., multiple linear arrays) that are configured to transmit the sub-components of an RF signal. It will also be appreciated that in some cases the radiating elements may not be disposed along a single line. For example, in some cases a linear array of radiating elements may include one or more radiating elements that are offset from a line along which the remainder of the radiating elements are aligned. This "staggering" of the radiating elements may be done to design the array to have a desired azimuth beamwidth. Such staggered arrays of radiating elements that are configured to transmit the sub-components of an RF signal are encompassed by the term "linear array" as used herein.

As used herein, "monolithic" means an object that is a single, unitary piece formed or composed of a material without joints or seams.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The term "about" with respect to a number, means that the stated number can vary by +/−20%.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a reflector assembly including a reflector;

feed boards oriented perpendicular to the reflector and that extend longitudinally and reside on right and left sides of the reflector; and a radiating element extending forwardly from the reflector;

wherein the reflector includes:

a nonmetallic substrate; and a metal layer on the substrate.

2. The base station antenna of claim 1, wherein the substrate is formed from a polymeric material.

3. The base station antenna of claim 2, wherein the metal layer is integrated directly to the substrate.

4. The base station antenna of claim 1, wherein the metal layer has a thickness in the range of from about 0.004 mm and 0.5 mm.

5. The base station antenna of claim 1, further comprising a plurality of longitudinally and laterally spaced apart through holes extending through the metal layer and substrate.

6. The base station antenna of claim 1, wherein the reflector assembly includes at least one support member affixed to the substrate to support the reflector.

7. The base station antenna of claim 6, wherein the least one support member includes a pair of opposed support members affixed to the substrate to support the reflector.

8. The base station antenna of claim 7, wherein each of the support members defines a lengthwise channel or tubular passage.

9. The base station antenna of claim 7, wherein each of the support members includes cut outs defined therein.

10. The base station antenna of claim 1, wherein the metal layer is formed as an in-mold decoration on or into the substrate.

11. The base station antenna of claim 1, wherein the metal layer is at least partially patterned with conductive patches and defines a frequency selective surface and/or substrate.

12. The base station antenna of claim 1, wherein the substrate includes integral stiffening features that project forward, and wherein the radiating element extends forward of the integral stiffening features.

13. The base station antenna of claim 12, wherein the stiffening features are provided as a plurality of ribs, including laterally spaced apart and longitudinally extending ribs and at least one laterally extending rib that extends laterally across the base station antenna, perpendicular to at least some of the longitudinally extending ribs, optionally wherein a plurality of mounting holes extend through at least some of the ribs.

14. The base station antenna of claim 13, wherein at least one primary surface of the longitudinally extending ribs is orthogonal to a primary surface of the reflector and comprises a metal layer thereby providing an isolation fence extending between neighboring radiating elements of different linear arrays of radiating antenna elements.

15. The base station antenna of claim 1, wherein the radiating element is a plurality of radiating elements arranged as a plurality of columns of first radiating elements configured for operating in a first operational frequency band, each column of first radiating elements arranged in a longitudinal direction of the base station antenna, wherein the nonmetallic substrate and the metal layer cooperate to define at least one frequency selective surface configured such that electromagnetic waves within the first operational frequency band are substantially blocked by the reflector.

16. The base station antenna of claim 15, wherein the first operational frequency band is a low band frequency range.

17. The base station antenna of claim 1, wherein the nonmetallic substrate comprises a dielectric board having opposite first and second sides, the first and second sides facing the radiating element and front of the base station antenna, wherein the metal layer is formed with a periodic conductive structure on at least one of the first and second sides, and wherein the periodic conductive structure forms a frequency selective surface.

18. The base station antenna of claim 17, wherein the metal layer is provided as a first periodic conductive structure on the first side of the dielectric board and a second periodic conductive structure on the second side of the dielectric board, and wherein the periodic conductive structure on the second side of the dielectric board is different from the periodic structure on the first side of the dielectric board.

19. The base station antenna of claim 1, wherein the nonmetallic substrate and the metal layer are implemented as a multi-layer printed circuit board, one or more layers of which formed with a frequency selective surface configured such that electromagnetic waves within a first frequency range propagates through the reflector, and wherein the one or more layers of the multi-layer printed circuit board reflects electromagnetic waves in a different operational frequency band.

20. The base station antenna of claim 1, wherein the metal layer comprises an array of conductive patches that merges into right and left outer perimeter sides that have full metal areas.

21. A base station antenna, comprising:

a reflector assembly including a reflector;

at least one feed board on a right side perimeter of the reflector and at least one feed board on a left side perimeter of the reflector, each at least one feed board residing adjacent to and behind or in front of the reflector; and a radiating element extending forwardly from the reflector;

wherein the reflector includes:

a nonmetallic substrate; and a metal layer on the substrate.

22. The base station antenna of claim 21, wherein the reflector comprises a frequency selective surface or a frequency selective substrate or a frequency selective surface and a frequency selective substrate configured to reflect or block radiofrequency signal in a low band frequency range and pass radiofrequency signal in a higher band frequency range.

23. A method of forming a reflector for a base station antenna, comprising:

providing an injection molded substrate; and metallizing a primary surface of the injection molded substrate with a metal pattern configured to define a frequency selective surface that blocks or reflects radio frequency signal at low band frequencies and allows higher band frequencies to pass therethrough thereby defining the reflector.

* * * * *